US007922579B2

(12) United States Patent
Walker et al.

(10) Patent No.: US 7,922,579 B2
(45) **Date of Patent: *Apr. 12, 2011**

(54) METHOD AND APPARATUS FOR COLLECTING INDICIA FOR A SECONDARY GAME FROM A PRIMARY WAGERING GAME

(75) Inventors: Jay S. Walker, Ridgefield, CT (US); James A. Jorasch, New York, NY (US); Robert C. Tedesco, Fairfield, CT (US)

(73) Assignee: Walker Digital, LLC, Stamford, CT (US)

(*) Notice: Subject to any disclaimer, the term of this patent is extended or adjusted under 35 U.S.C. 154(b) by 1064 days.

This patent is subject to a terminal disclaimer.

(21) Appl. No.: 11/311,505

(22) Filed: Dec. 19, 2005

(65) Prior Publication Data

US 2006/0079309 A1 Apr. 13, 2006

Related U.S. Application Data

(60) Provisional application No. 60/673,376, filed on Dec. 17, 2004, provisional application No. 60/637,249, filed on Dec. 17, 2004.

(51) Int. Cl.
*A63F 9/24* (2006.01)
*G06F 17/00* (2006.01)

(52) U.S. Cl. ................ 463/25; 463/13; 463/16; 463/20; 463/42

(58) Field of Classification Search ........................ None
See application file for complete search history.

(56) References Cited

U.S. PATENT DOCUMENTS

| | | | | |
|---|---|---|---|---|
| 4,743,022 | A | 5/1988 | Wood | 273/85 |
| 5,393,057 | A * | 2/1995 | Marnell, II | 463/13 |
| 5,531,441 | A | 7/1996 | Dabrowski et al. | 463/12 |
| 5,542,669 | A | 8/1996 | Charron et al. | 463/13 |
| 5,639,088 | A * | 6/1997 | Schneider et al. | 273/138.2 |
| 5,707,285 | A * | 1/1998 | Place et al. | 463/12 |
| 5,732,950 | A | 3/1998 | Moody | 273/292 |
| 5,743,800 | A * | 4/1998 | Huard et al. | 463/26 |
| 5,769,716 | A | 6/1998 | Saffari et al. | 463/20 |
| 5,772,506 | A | 6/1998 | Marks et al. | 463/13 |
| 5,816,914 | A | 10/1998 | Wichinsky | 463/13 |
| 5,833,537 | A * | 11/1998 | Barrie | 463/21 |
| 6,048,267 | A | 4/2000 | Wichinsky | 463/13 |

(Continued)

OTHER PUBLICATIONS

Scarne's Encyclopedia of Games, by John Scarne, copyright 1973, pp. 6-53.*

(Continued)

*Primary Examiner* — M. Sager
(74) *Attorney, Agent, or Firm* — FinchamDowns, LLC; Magdalena M. Fincham

(57) ABSTRACT

A method and apparatus for a wagering game is described that allows a player to collect indicia from a series of individual primary games to form a winning game outcome in a single secondary game. In one embodiment, the secondary game is won through the collection of a specified number and/or type of indicia. The primary game may have its own pay table with, for example, traditional winning game outcomes for card type games. The number of primary games available to contribute toward a winning secondary game outcome may be limited to a predetermined number of primary game outcomes or a period of time during which game outcomes may be obtained. Alternatively, or in addition, collected indicia obtained from a series of primary game outcomes may expire after a predetermined duration.

16 Claims, 33 Drawing Sheets

U.S. PATENT DOCUMENTS

| | | | | |
|---|---|---|---|---|
| 6,050,568 | A | 4/2000 | Hachquet | 273/292 |
| 6,077,163 | A | 6/2000 | Walker et al. | |
| 6,179,710 | B1 | 1/2001 | Sawyer et al. | |
| 6,179,711 | B1 | 1/2001 | Yoseloff | 463/25 |
| 6,203,430 | B1 * | 3/2001 | Walker et al. | 463/20 |
| 7,140,964 | B2 | 11/2006 | Walker et al. | |
| 2003/0157978 | A1 * | 8/2003 | Englman | 463/16 |
| 2003/0220138 | A1 | 11/2003 | Walker et al. | |
| 2004/0162130 | A1 * | 8/2004 | Walker et al. | 463/16 |
| 2004/0162134 | A1 * | 8/2004 | Walker et al. | 463/20 |
| 2004/0171419 | A1 * | 9/2004 | Walker et al. | 463/20 |
| 2004/0242300 | A1 | 12/2004 | Nicely et al. | |
| 2005/0233794 | A1 | 10/2005 | Cannon et al. | |
| 2005/0250576 | A1 | 11/2005 | Kane et al. | |
| 2006/0079309 | A1 * | 4/2006 | Walker et al. | 463/13 |
| 2006/0247018 | A1 * | 11/2006 | Walker et al. | 463/20 |
| 2006/0252482 | A1 * | 11/2006 | Walker et al. | 463/13 |
| 2006/0252499 | A1 * | 11/2006 | Walker et al. | 463/20 |
| 2006/0287035 | A1 * | 12/2006 | Walker et al. | 463/13 |
| 2008/0153565 | A1 * | 6/2008 | Wakker et al. | 463/16 |

OTHER PUBLICATIONS

Office Action for U.S. Appl. No. 11/456,714 mailed Dec. 26, 2008, 10 pp.

International Search Report for PCT/US06/62228 mailed Jan. 18, 2008, 2 pp.

Written Opinion for PCT/US06/62228 mailed Jan. 18, 2008, 5 pp.

* cited by examiner

400

| PLAYER ID 410 | SOCIAL SECURITY NUMBER 412 | NAME 414 | ADDRESS 416 | PHONE NUMBER 418 | CREDIT CARD NUMBER 420 | CREDIT BALANCE 422 | (ACCUMULATED) COMP. POINTS 424 | HOTEL GUEST 426 | PLAYER RATING 428 |
|---|---|---|---|---|---|---|---|---|---|
| 123456 | 123-45-7890 | BILL GREEN | 111 NORTH AVE. | (212) 555-1234 | 1111-2222-3333-4444 | $25.00 | 130 PTS. | NO | 4 |
| 876543 | 876-54-3210 | ROB BLUE | 423 SOUTH ST. | (812) 555-4321 | 2222-4444-6666-8888 | $17.50 | 240 PTS. | YES | 2 |
| 158595 | 555-12-6338 | KAREN RED | 64 WEST RD. | (315) 555-5954 | 1111-3333-5555-7777 | $0.00 | 350 PTS. | YES | 2 |

FIG. 4

500

| OUTCOME 510 | PAYOUT 520 | | | | |
|---|---|---|---|---|---|
| | 1 COIN WAGER | 2 COIN WAGER | 3 COIN WAGER | 4 COIN WAGER | 5 COIN WAGER |
| ROYAL FLUSH | 250 | 500 | 750 | 1000 | 4000 |
| STRAIGHT FLUSH | 50 | 100 | 150 | 200 | 250 |
| FOUR OF A KIND | 25 | 50 | 75 | 100 | 125 |
| FULL HOUSE | 9 | 14 | 27 | 36 | 45 |
| FLUSH | 6 | 12 | 18 | 24 | 30 |
| STRAIGHT | 4 | 8 | 12 | 16 | 20 |
| THREE OF A KIND | 3 | 6 | 9 | 12 | 15 |
| TWO PAIR | 2 | 4 | 6 | 8 | 10 |

FIG. 5

FROM FIG. 12A

1700

| PLAYER: P-102737 | | | | |
|---|---|---|---|---|
| INITIAL / DEALT HAND | HELD CARDS CHOICE 1 | HELD CARDS CHOICE 2 | HELD CARDS CHOICE N | ACTUAL HELD CARDS 1710 |
| Ah-7h-Jh-5c-10d | Ah-7h-Jh | Ah | (NO CARDS HELD) | 1 |
| Ah-7h-Jh-5c-2d | Ah-7h-Jh | Ah | (NO CARDS HELD) | 1(X12), 2(X3) |
| Ah-7h-Jh-5c-3d | Ah-7h-Jh | Ah | (NO CARDS HELD) | - |
| Ah-7h-Jh-5c-4d | Ah-7h-Jh | Ah | (NO CARDS HELD) | - |

FIG. 17

METHOD AND APPARATUS FOR COLLECTING INDICIA FOR A SECONDARY GAME FROM A PRIMARY WAGERING GAME

This application claims the benefit of priority of:

U.S. Provisional Patent Application Ser. No. 60/673,376, filed on Dec. 17, 2004, and entitled METHOD AND SYSTEM OF VIDEO POKER, the contents of which is hereby incorporated by reference in its entirety herein for all purposes;

and

U.S. Provisional Patent Application Ser. No. 60/637,249 filed on Dec. 17, 2004, and entitled METHOD AND APPARATUS FOR FACILITATING ACCUMULATION OF GAME INDICIA, the contents of which is hereby incorporated by reference in its entirety herein for all purposes.

FIELD

The present invention relates generally to gaming devices, and more particularly, to systems and methods for playing card games such as video poker.

BACKGROUND

Gaming has become an increasingly important industry in the United States and around the world. In games of chance, a player typically places a wager on one or more games, and either receives a payout or loses the wager based on the game outcome. Examples of gaming devices include, without limitation, video poker gaming devices, mechanical reel slot machines, and video slot machines.

Slot machines are highly profitable for casinos in the United States. Slot machines often account for well over one-half of the overall profits of most casinos. If past performance is any indication, interest in slot machines is growing. This can be attributed in large part to the development of electronic-type slot machines, such as those simulating various video poker games. Many players find video poker machines to be a more interesting alternative to traditional slot machines because they allow the player to implement a strategy that may potentially increase the probability of obtaining a winning game outcome.

The earliest devised draw poker video gaming machines provided a draw poker game that allowed the player the opportunity to determine a strategy and discard and draw replacement cards in an attempt to obtain a winning game outcome. After placing a wager on a hand (i.e., inserting a predetermined number of coins) early video poker machines dealt playing cards from a standard fifty-two (52) card poker deck and displayed a single five (5) card hand to the player on a display screen. Thereafter, the player selected which of the five (5) playing cards he wanted to hold. Replacement cards were then dealt and displayed. Finally, the machine determined the player's winnings for the resulting five-card hand based on a poker hand ranking scheme.

Applicants have recognized that some gaming establishment operators would find it appealing to be able to offer systems and methods that encourage players to play longer sessions, while at the same time maintaining acceptable payback percentages for the operators, as provided in accordance with one or more embodiments of the present invention.

SUMMARY

To increase player interest in video poker, and maintain acceptable payback percentages, a secondary game (such as a bonus game) is described in several embodiments that can be played in conjunction with a video poker game.

According to one or more embodiments, the game can generally be described as a series of individual primary games (e.g., video poker games) that can be won or lost while playing a continuous secondary game that may benefit from each of the individual primary games. The player builds toward a potentially winning secondary game outcome as each primary game is played. Consequently, regardless of a loss in an individual primary game, the player may still make progress toward a winning game outcome in the secondary game.

The secondary game can be played simultaneously in some embodiments with the video poker game, allowing a player to shift strategies between winning the primary game (e.g., video poker game) or winning the secondary game. In various embodiments, these strategies may be conflicting, and in other embodiments, the strategies may be mutually beneficial for both the primary game and the secondary game.

The complexity of the strategies that may be implemented generally appeal to video poker players who want the opportunity to evaluate different courses of action and determine the optimum course of action to maximize their potential return. Secondary games allow for additional and alternative strategies not common to traditional card play, thereby increasing excitement and interest of game play. Various embodiments of these secondary games provide novel and unique methods for playing card games such as video poker, and serve to prolong gaming sessions with their increased entertainment value.

BRIEF DESCRIPTION OF THE DRAWINGS

Various embodiments are described herein with reference to the accompanying drawings. In the drawings, like reference numerals indicate identical or functionally similar elements. The leftmost digit(s) of a reference numeral typically identifies the figure in which the reference numeral first appears. As will be understood by those skilled in the art, the drawings and accompanying descriptions presented herein indicate some exemplary arrangements. Similarly, the illustrated figures represent exemplary information, but those skilled in the art will understand that the number and content of the figures can be different from those illustrated herein. A brief description of the drawings follows.

FIG. 4 is an example of a player database that may be associated with a player-tracking program.

FIG. 5 is an example of a primary game pay table.

FIG. 17 is an example of one embodiment of a decisions database.

DETAILED DESCRIPTION OF EMBODIMENTS

Numerous embodiments are described in this patent application, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be used and that structural, logical, software, electrical and other changes may be made without departing from the scope of the present invention. Accordingly, those skilled in the art will recognize that the present invention may be practiced with various modifications and alterations.

Although particular features may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

Certain embodiments will now be described in detail with reference to the drawings. Although the embodiments discussed herein are directed to video gaming devices (e.g., video poker machines, video blackjack machines, video roulette, video keno, and the like), it should be understood that the embodiments are equally applicable to slot type gaming devices with mechanical reels.

Gaming Network Description

Figure 1:
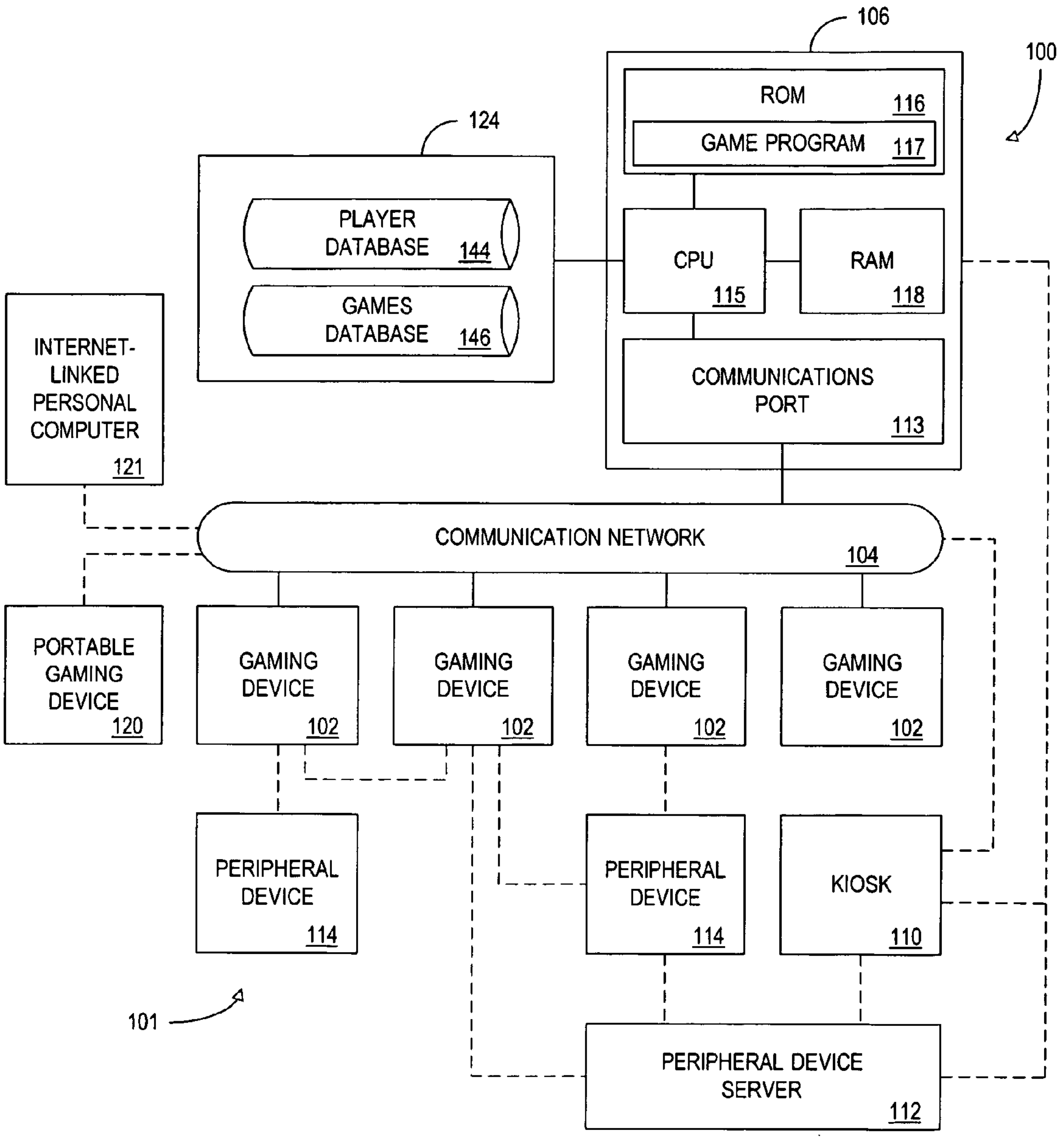
FIG. 1 is an overall schematic view of one embodiment of a gaming network.

Referring now to FIG. 1, illustrated therein is an example embodiment of a gaming network 100 that may be used to implement one or more embodiments described herein. The gaming network 100 of FIG. 1 includes a plurality of network devices 101 that are directly or indirectly in communication with the gaming network 100 to accept wagers, determine game outcomes, and provide payouts for winning game outcomes. Among these network devices 101 is a gaming server 106 that is in communication with one or more other network devices; such as gaming devices 102 (e.g., video slot machines, video poker machines, and mechanical reel slot machines); kiosks 110, casino personnel devices (not shown); merchant point-of-sale (POS) terminals (not shown); a peripheral device server 112; component devices (e.g., display screens) (not shown); peripheral devices 114 (e.g., card readers); handheld gaming devices 120 (e.g., a PDA or cell phone); and an internet linked personal computer 121. These devices and their functions are described in detail below.

Each gaming device 102, and every other network device 101 in the gaming network 100 that communicates with another network device in the gaming network, is uniquely identified by device identification (ID) number, to allow communication with the gaming server 106 via the gaming network 100. The gaming network 100 may communicate with devices directly or indirectly, via a wired or wireless medium to a communication network 104 such as the Internet, LAN, WAN or Ethernet, Token Ring, or via any appropriate communications means or combination of communications means. It is to be understood, however, that other arrangements in which the gaming devices 102 communicate with the server 106 are also possible.

A variety of communications protocols may be part of the system, including but not limited to: Ethernet (or IEEE 802.3), SAP, SAS, SUPERSAS, ATP, BLUETOOTH, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device 102 and various component devices and/or peripheral devices 114 (e.g., printers, bill acceptors, etc.), (ii) the Best of Breed (BOB) standard, which may facilitate communication between a gaming device 102 and various servers 106 related to play of one or more gaming devices (e.g., servers that assist in providing accounting, player-tracking, content management, ticket-in/ticket-out and progressive jackpot functionality), and/or (iii) the System-to-System (S2S) standard, which may facilitate communication between game-related servers 106 and/or casino property management servers (e.g., a hotel server comprising one or more databases that store information about booking and reservations). Communication may be encrypted to ensure privacy and prevent fraud in any of a variety of ways well known in the art.

The gaming device 102 may be implemented as a system server, a dedicated hardware circuit, an appropriately programmed general-purpose computer, or any other equivalent electronic, mechanical or electromechanical device. The gaming device 102 may comprise any or all of the gaming devices of the aforementioned systems.

In some embodiments, a gaming device 102 may comprise a handheld gaming device 120—for example, a portable handheld gaming device (e.g., a device similar to a PDA) or a cell phone that may be used in place of, or in addition to, some or all of the gaming device components. The handheld gaming device 120 may be used to view "walk away" game outcomes from a gaming device 102.

In this situation, the handheld gaming device 120 is in communication with the gaming device 102 in the gaming network 100. In some embodiments, game outcomes may be automatically generated by a device (e.g., a gaming device 102) and communicated to the player via the handheld gaming device 120 or downloaded onto the handheld gaming device. This allows the player the convenience of walking anywhere in the gaming establishment (or, in some embodiments, being outside of the gaming establishment) and still receiving and/or viewing game outcomes from the player's gaming device 102. The gaming server 106, in one embodiment, may communicate game outcomes from a gaming device 102 to the player's handheld gaming device 120 (such as a PDA or cell phone) to enable a player to remotely view game outcomes received from the gaming device.

Further, a gaming device 102 may comprise an Internet linked personal computer 121 that may be operable to communicate with an online casino and facilitate game play at the online casino or on the gaming network 100. In one embodiment, the Internet capable personal computer 121 may receive game outcomes produced by a gaming device 102 in the gaming establishment similar to the portable gaming device 120 described above. In one embodiment, the gaming server 106 communicates the game outcomes received from a player's gaming device 102 to the player's personal computer 121. In some embodiments, the player's personal computer 121 may store a program for viewing such game outcomes.

The peripheral device server 112 may be available to provide additional communication capabilities between peripheral devices 114 in the gaming network 100. These peripheral devices 114 may include player-tracking devices, additional screen displays, ticket readers and printers, etc.

In some embodiments, a kiosk 110 may be configured to execute or assist in the execution of various processes of the gaming network 100. In some embodiments, a kiosk 110 may comprise a processor and a memory. A kiosk 110 may also comprise various input devices (e.g., a keypad, a keyboard, a mouse, buttons, etc.) A kiosk may communicate with any or all of (i) a gaming server 106, and/or (ii) a gaming device 102. A number of kiosks 110 may be stationed within casino premises (e.g., at various locations on a slot floor). The kiosk 110 may allow a player to customize the gaming experience or cash out game winnings. The kiosk 110 may also be available to the player for purchasing flat-rate gaming sessions, purchasing goods and services with player loyalty points, registering for a player loyalty program, etc.

The gaming devices 102, the kiosk 110, and the peripheral device server 112 as well as all other network devices 101 are in communication with the gaming server 106. The gaming server 106 will now be described in detail with reference to FIG. 1. Like the gaming device 102, the gaming server 106 has a central processing unit CPU 115. The server executes the instructions of a game program 117 stored in Read Only Memory (ROM) 116 from Random-Access Memory (RAM) 118. Additionally, the CPU 115 is coupled to a data storage device 124, having a plurality of databases.

In order to communicate with gaming devices 102 and/or other network devices 101, the gaming server 106 also includes a communications port 113. The communication port 113 connects the server CPU 115 to the gaming device 102. Thus, the CPU 115 of the gaming server 106 can control the communication port 113 to receive and transmit information from the communications network 104 to the network devices 101 in the gaming network 100.

The player database 144 may serve as one example of the communication capability of the communication network 104 to exchange data between the gaming server 106 and the gaming devices 102. The player database 144 may be used to store data associated with specific players that are members of a gaming establishment's player loyalty program. These programs reward players with complementary points as players wager on the gaming establishment's gaming devices. These loyalty points are generally redeemable for gifts and other discounts on goods and services (e.g., those offered by the gaming establishment).

The player database 144 may store player wagering data that can be converted into loyalty points and accumulated in the player's account. As will be described in detail below, in one embodiment, the gaming device 102 communicates player identifying information to the gaming server 106. The gaming server 106, in turn, verifies the player identifying information. This identification then allows the server to collect statistical data regarding the player's game play (e.g., wagering activity).

The player database 144 may alternately or additionally store various other data associated with a player, such as the type of game or gaming device a player is currently playing or has played, the length of time a player has played a certain game or gaming device, information regarding wins and losses (e.g., total amount won/lost for a given period of time, consecutive wins/losses, percentage of all plays that are wins/losses, etc.).

The player database 144 may also contain other information that may be useful for satisfying player needs (e.g., outstanding debts, lodging arrangements, and the like). For example, the player database 144 may store data regarding a given player's standing in a game session, so that the player can continue the game session at one of a plurality of gaming devices that have common access to the player database 144. The player database may also track and record the player's progress in games that extend over a series of game plays, similar to tracking player loyalty points.

Player data may be stored in a relational database and retrieved or otherwise accessed by the CPU 115 after receiving a "key" data point from the player, such as a unique identifier read from the player's player-tracking card or cashless gaming voucher, PIN or code entered by a player using an input device of the gaming device 102, etc. It is contemplated that players may also identify themselves in a variety of other manners, such as by providing biometric identifiers, RFID identity devices, etc.

The player database 144 of the present embodiment may include multiple records having multiple fields of information. For example, turning to FIG. 4, an example of a player database 144 (FIG. 1) is illustrated. The player database 400 comprises multiple records, each record being associated with a particular player, as identified by a player identification (ID) number 410. The fields within each record include player identification (ID) number 410, Social Security number 412, name 414, address 416, telephone number 418, credit card number 420, credit balance 422, accumulated loyalty points 424, whether the player is a hotel guest 426, and player status rating 428. Having information related to one field, such as player ID 410, allows the gaming server 106 to retrieve all information stored in corresponding fields of that player's record.

Turning back to FIG. 1, the gaming network 100 may have a data storage device 124 for storing the player database 144 as well as storing other types of data in a number of databases. Examples of such databases include, but are not limited to, the player-tracking database 144 and a games database 146. It is to be understood that because the gaming devices 102 are in communication with the gaming server 106, information stored in a gaming device 102 may be stored in the gaming server 106 and vice versa. Thus, for example, in an alternate embodiment, the gaming device 102, rather than the data storage device 124 may store one or more of these databases. In other embodiments, some or all of these databases may be partially or wholly stored in another device, such as in a peripheral device server 112, kiosk 110, the gaming server 106, other gaming devices 102, etc.

It will be understood by one of ordinary skill in the art that (i) alternative database structures to those described herein may be readily employed; and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown.

Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes described herein. In addition, the databases may, in a known manner, be stored locally or remotely from a device that accesses data in such a database.

With the communication network 104 and access to data from the data storage device 124, the gaming server 106 may be operable to configure (or reconfigure) a gaming device 102 remotely, update software stored on a gaming device 102 and/or download software or software components to a gaming device 102. For example, a database (e.g., a payout or probability database) stored in the memory of gaming device 102 may be altered, modified, or updated remotely, hot fixes may be applied to software stored by the gaming device 102, and/or new versions of software may be downloaded to the gaming device. Similarly, the gaming device 102 may be programmed to retrieve any or all such updates from another device.

Gaming server 106 may be programmed (e.g., with program 117) to perform any or all of the above functions based on, for example, an occurrence of an event (e.g., a scheduled event), satisfying a condition, receiving an indication from a qualified casino employee and/or other person (e.g., a regulator) and/or receiving a request from a player.

The capability of the gaming server 106 to control the gaming device 102 can be extended to providing game outcomes to a gaming device 102 in some embodiments. In this embodiment, the gaming device 102 essentially comprises a thin client device controlled by the gaming server 106. The gaming server 106 may determine game outcomes for each of the gaming devices 102 and download those game outcomes (including associated graphics and audio data in some embodiments) to the gaming device 102. Multiple instances of the same game may be downloaded to different players on different gaming devices (i.e., the same game on server 106 may be producing different game outcomes for different players playing at the same time at different gaming devices 102).

Gaming Device Block Diagram

Figure 2:
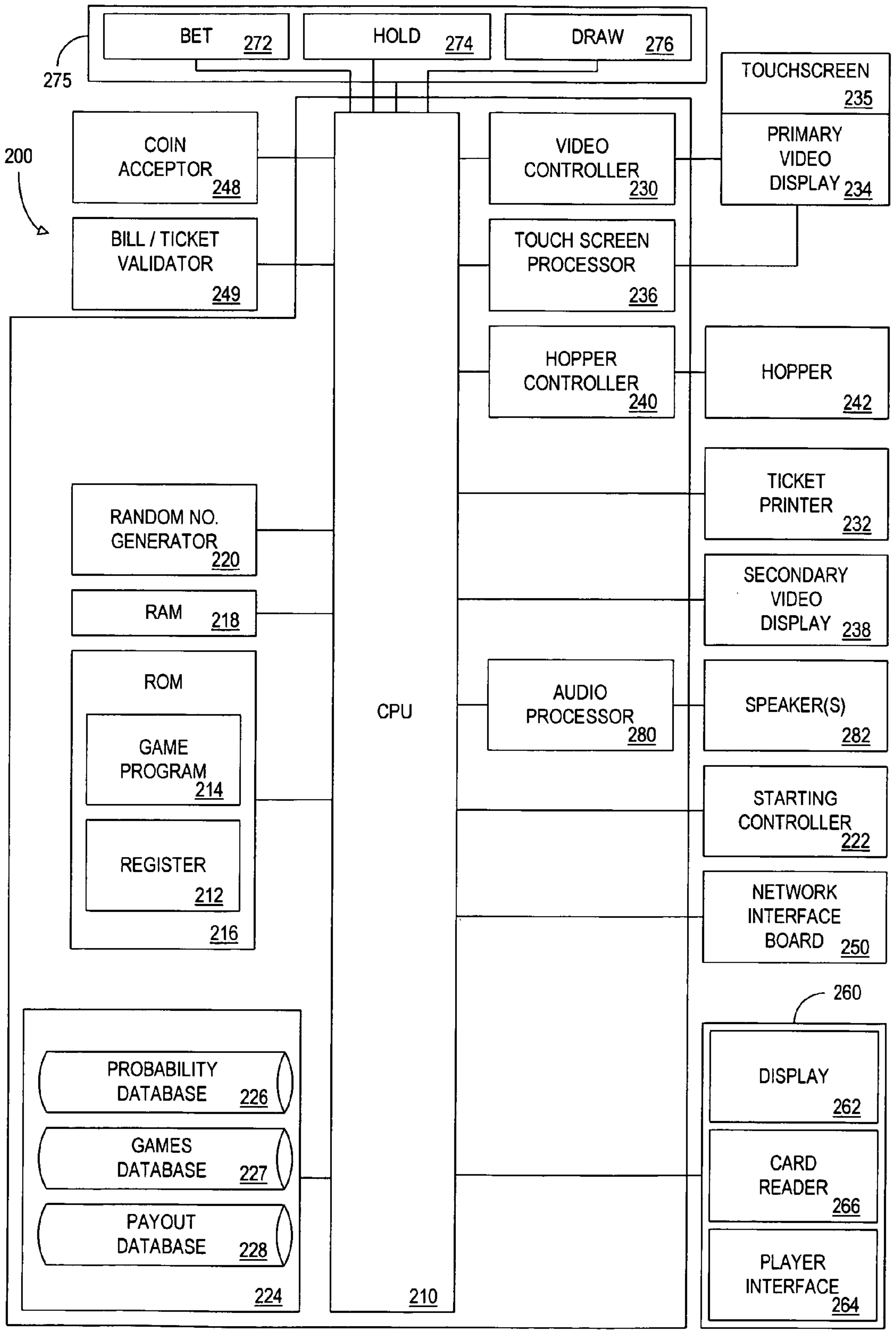
FIG. 2 is a schematic view of one embodiment of the gaming device shown in FIG. 1.

Referring now to FIG. 2, illustrated therein is one embodiment of a gaming device 200. The gaming device 200 may be an embodiment of a gaming device 102 shown in FIG. 1. The gaming device 200 has a CPU 210, which is communication with the communication network 104 of FIG. 1 through a network interface board 250. The network interface board 250 provides a communication path from the gaming device 200 to gaming server 106 through the gaming network 100. Thus, as discussed in detail below, information can be communicated between the gaming device 200 through its CPU 210 to the gaming server 106. In addition, the player-tracking device 260 and its associated player interface 264 (e.g., keypad) which is also in communication with the gaming device's CPU 210, may provide a communications link between the player and the gaming device 200—and even to the gaming server 106 through the gaming device's CPU 210.

It should be noted that although the gaming device 200 communicates with the server 106, such communication is not necessary to reconfigure the gaming device in response to satisfying a predetermined condition. However, such communications may be useful for augmenting standard gaming device data processing functions such as accounting and player-tracking.

With respect to gaming operations, the gaming device 200 operates in a conventional manner. The player starts the gaming device 200, for example, by inserting a coin into the coin acceptor 248 or a bill into the bill validator 249. A starting controller 222 may initiate operation of the gaming device 102 to produce a random game outcome.

The gaming device 200 contains a Central Processing Unit (CPU) 210 that executes instructions of a game program 214 stored in Read Only Memory (ROM) 216 for playing the gaming device 200. The CPU 210 performs instructions of the game program 214 and thereby operates to perform in accordance with the methods described in detail herein. The game program may also have a register 212 that acts to record predetermined aspects of game play as dictated by the game program 214. In this embodiment the register 212 is a part of the software code, but in other embodiment the register may be hard wired, a part of physical memory, or firmware. The game program 214 may be stored in a compressed, uncompiled, and/or encrypted format. The game program 214 furthermore includes program elements that may be necessary, such as an operating system, a database management system and "device drivers" for allowing the processor to interface with computer peripheral devices.

In some embodiments, a games database 227 is provided that includes a plurality of games that may be selectively implemented by the gaming device 200 to provide a player with a plurality of game choices offering different types of game play. The games provided may be at the player's request through the gaming device (e.g., through the pushbutton panel) or at the request of the gaming establishment (e.g., electronically through communication with the gaming serve 106 illustrated in FIG. 1 or through the appropriate manual configuration of the gaming device 102). For example, a player or gaming establishment may be able to choose between different types of video poker games (e.g., stud poker, draw poker) or from different types of card games (e.g., black jack) or even different types of wagering games (e.g., Keno).

According to one embodiment, the instructions of the game program 214 may be read into a main memory (e.g., Random Access Memory (RAM) 218) from another computer-readable medium such as from a ROM 216. The system bus carries the data to main memory, from which the CPU 210 retrieves and executes the instructions. The instructions received by main memory may optionally be stored in memory either before or after execution by the CPU 210. RAM 218 may also temporarily store information communicated to it by the CPU 210 during game play.

Execution of sequences of the instructions in game program 214 causes CPU 210 to perform the process steps described herein. In alternate embodiments, hard-wired circuitry may be used in place of, or in combination with, software instructions for implementation of the reconfiguration process. Thus, the various embodiments are not limited to any specific combination of hardware and software.

The CPU 210 and the memory 216 and 218 may each be, for example: (i) located entirely within a single computer or other device; or (ii) connected to each other by a remote communication medium, such as a serial port cable, telephone line, or radio frequency transceiver. In one embodiment, the gaming device 200 may comprise one or more devices that are connected to a remote server for maintaining databases.

Under control of a program stored, for example ROM 216, the CPU 210 initiates the RNG 220 to generate a random number. The random number generator 220, in accordance with at least one embodiment, may generate data representing random or pseudo-random values (referred to as "random numbers" herein).

The random number generator 220 may generate a random number, for example, every predetermined unit of time (e.g., every thousandth of a second) or in response to an initiation of a game on the gaming device 102. In the former embodiment, the generated random numbers may be used as they are generated (e.g., the random number generated at substantially the time of game initiation is used for that game) and/or stored for future use. A random number generated by the random number generator 220 may be used by the CPU 210 to determine, for example, at least one of an outcome and payout.

A random number generator 220, as used herein, may be embodied as a secondary processor, separate from but working in cooperation with the CPU 210. Alternatively, the random number generator 220 may be embodied as an algorithm, program component, or a software program stored in the memory of the gaming device 200 and used to generate a random number. Note that, although the generation or obtainment of a random number is described herein as involving a random number generator 220 of a gaming device 200, other methods of determining a random number may be employed.

For example, a gaming establishment may obtain sets of random numbers that have been generated by another entity. For example, there are services that provide random numbers that have been generated by timing successive pairs of radioactive decays detected by a Geiger-Muller tube interfaced to a computer.

As would be understood by one of ordinary skill in the art, a random number generator 220 may be stored in a device other than a gaming device 200. For example, in some embodiments, a gaming device 200 may receive random numbers and/or any other data related to the random or pseudo-random determination of an outcome from a separate device, such as the gaming server 106 shown in FIG. 1. In fact, the gaming server 106 (and/or the data storage device 124) may contain, in some embodiments, not only the random number generator 220, but also the probability and pay table databases necessary to determine a winning game outcome, and the payout award for such a winning game outcome. This arrangement might be implemented in a specialized gaming device 102 such as a thin-client type gaming device (i.e., a dumb terminal or smart-enough terminal).

It should be noted that such embodiments may be advantageous in environments or jurisdictions wherein the "central determination" of outcomes is required by regulation or otherwise preferred. Thus, for example, outcomes may be determined centrally by a game server, and then propagated (e.g.; electronically) such that indications of the outcomes may be viewed using one or more gaming devices (e.g., "Class II" gaming devices, "thin-client" gaming devices in a server-based "Class III" gaming architecture, Video Lottery Terminals, and so on).

The CPU 210 as shown in FIG. 2 looks up the generated random number in a stored probability database 226, which contains a list that matches random numbers to corresponding game outcomes to determine a game outcome based on the generated random number.

A probability database 226 may be stored in the gaming device's 200 ROM 216 or in any other data storage device. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator 220; and (ii) an outcome that indicates the one or more indicia comprising the outcome that corresponds to the random number of a particular record. These indicia comprise the game outcome that is then displayed to the player in the primary video display 234.

The indicia representing the game outcome may comprise cards from a card deck displayed on the video display on a video poker gaming device. The book "Winning at Slot Machines" by Jim Regan (Carol Publishing Group Edition, 1997) illustrates examples of payout and probability tables and how they may be derived. The entirety of this book is hereby incorporated by reference herein for all purposes.

Based on the identified game outcome, the CPU 210 locates the appropriate payout in a stored payout database 228. The payout database 228 may be stored in the gaming device's RAM 218 (alternatively, the payout database may also be stored in any other data storage device).

A payout database 228 may store a number of entries associated with each possible game outcome represented by the indicia determined by the probability database. Turning to FIG. 5, an exemplary tabular representation of a payout database 500 is shown, defining fields for each of the entries or records. This payout database 500 may be one embodiment of the payout database 228 shown in FIG. 2. The fields in FIG. 5 specify: (i) an outcome 510, which indicates the one or more indicia comprising a given outcome, and (ii) a payout 520 that corresponds to each respective outcome. The outcomes 510 may be those obtained from winning game outcomes typically obtainable on a video poker gaming device (e.g., royal flush, straight flush, straight, four-of-a-kind, full house, two pair, three-of-a-kind, and pair). The size of the payout depends on the number of coins wagered as is currently implemented in existing video poker games. With the payout database 500, the payout amount of any winning game outcome can be determined.

The described entries of the player tracking database 400 and the payout database 500 represent exemplary information only; those skilled in the art will understand that the number and content of the entries can be different from those illustrated herein. Further, despite any description of the databases as tables, an object-based model could be used to store and manipulate the data types and likewise, object methods or behaviors can be used to implement the processes described herein.

Returning to FIG. 2, in addition to determining a game outcome, the CPU 210 controls a variety of peripheral devices associated with the gaming device 200 that may be used to assist the player in making wagers and receiving payouts. The CPU 210 is operable to communicate (e.g., via a protocol such as GDS) with these various peripheral devices associated with the gaming device 102.

The following is a description of some of these peripheral devices that are available in gaming devices 200. These peripheral devices may be classified as either input devices (e.g., player to gaming device), output devices (e.g., gaming device to player), or interface devices that have both input and output type characteristics. It should be understood that not all of the peripheral devices are necessary, and further, that the peripheral devices may be used in any combination, including using a plurality of the same peripheral device in a single gaming device 200.

Some examples of input devices include wager acceptors for initiating game play on the gaming device 200, such as the coin acceptor 248. A coin acceptor 248 is coupled to the CPU 210. Each coin received by the coin acceptor 248 is registered by the CPU 210. A hopper controller 240 is connected to a hopper 242 for dispensing the collected coins when a winning game outcome occurs. In addition, when the player requests to cash out by pushing a cash out button (not shown) on the gaming device 200, the CPU 210 checks the RAM 218 to see if the player has any credit and, if so, signals the hopper controller 240 to release an appropriate number of coins into a payout tray (not shown).

Another type of wager acceptor is the bill/ticket validator 249. The bill/ticket validator 249 accepts either paper currency or ticket vouchers. This ticket voucher operates similarly to cash and is generally accepted by most gaming devices 200 in the gaming establishment with a bill/ticket validator 249.

The voucher is printed by a ticket printer 232 located in the gaming device 200. For example, when a player cashes out, instead of accepting payment in coin, the player may request a ticket voucher. The credit balance last shown on the credit balance meter of the gaming device 200 is transferred to the ticket voucher. The ticket voucher generally contains a barcode and other legible indicia that indicates the gaming establishment and the monetary value of the voucher.

The barcode on the voucher is machine-readable by the bill/ticket validator 249. The player inserts the voucher (as the player would for paper currency) into the bill/ticket validator 249 and the value of the voucher is determined. The gaming device 200 communicates with a gaming server 106 (shown in FIG. 1) that manages the accounting associated with such ticket-in/ticket-out transactions (e.g., to track the issuance, redemption and expiration of such vouchers). An example of such ticket-in/ticket-out technology, the EZ PAY system, is manufactured by International Gaming Technology, headquartered in Reno, Nev. The monetary value of the voucher when inserted into the bill/ticket voucher reader is displayed on the gaming device's credit meter and is available for wagering. Other forms of payment may be available including the use of credit cards, debit cards, etc. to make wagers.

Also in communication with the CPU 210 is a player-tracking device 260. The CPU 210 is in turn in communication with a server 106 (shown in FIG. 1) that contains the player database 144. The player-tracking device 260 has a card reader 266 as shown in FIG. 2, which accepts a player-tracking card for reading player-identifying information stored on a player-tracking card (e.g., a player identification (ID) number). Although not so limited, the player-tracking card of the present embodiment stores the player ID on a magnetic strip located thereon. Alternatively, any player identifying indicia may be used, including biometric indicia—and not require a separate player tracking card for player identification.

The player-tracking device 260 has a player-tracking display 262 and a player interface 264 that allows the gaming device 200 and/or server 106 to communicate with the player. The player interface 264 may include a keypad and/or a touch screen display. The player-tracking device 260 may be used to not only track player wagering, but also used as a communication device to specify conditions and instructions for the reconfiguration of gaming device 200.

Other examples of input devices that facilitate game play include the pushbutton panel 275. The pushbutton panel 275 allows the player to make various choices including wager amounts and games selections. For example, a player may register a bet by pressing the bet button 272 to wager a credit on a game. The pushbutton panel 275 may also include buttons to control game play, including a hold button 274 to indicate indicia a player may desire to hold rather than discard, and a draw button 276 to draw additional indicia to replace discarded indicia. The pushbuttons 272, 274, 276 are coupled to the CPU 210. Pressing a pushbutton transmits a signal to the CPU 210, allowing a CPU to process the signal and perform the requested function.

Other examples of input devices include microphones, video cameras, etc. (not shown) which also may be in communication with the CPU 210 or with the player-tracking device 260. These devices may be used to collect information regarding the player or the game, which may then be processed to customize or otherwise alter game play.

The CPU 210 may also be operable to communicate with various output devices. In some embodiments, an output device comprises a game display. The primary video display 234 and secondary video display 238 may comprise, for example, one or more display screens or areas for outputting information related to game play on the gaming device 200, such as a cathode ray tube (CRT) monitor, liquid crystal display (LCD) screen, and/or light-emitting diode (LED) screen.

In one or more embodiments, a gaming device 200 may comprise more than one game display. For example, a gaming device 200 may comprise an LCD display for displaying electronic reels (or card hands in the case of a video poker gaming device) (e.g., a primary video display 234) and a display area that displays rotating mechanical reels.

Alternately, a gaming device 200 may have, in some embodiments, a video display 234 for displaying the outcome of a primary game and a secondary video display 238 on the gaming device for other uses (e.g., display rules for playing a game of the gaming device, the outcome of secondary games played in conjunction with the primary game, pay table for awarding game outcomes in the primary game, etc.).

The CPU 210 may also be in communication with one or more other output devices. Such devices may comprise, for example, a primary video display 234 through a video controller 230, an audio speaker 282 through an audio processor 280; headphones; an infrared transmitter; a radio transmitter; an electric motor, etc. The CPU 210 may also be in communication with a wireless handheld gaming device 120 (shown in FIG. 1) that may receive, in some embodiments, game outcomes from gaming device 200.

Another type of output device may be included in gaming device 200 to pay off winning game outcomes. For example, the coin hopper 242 may pay out coins from the gaming device and/or a ticket voucher may be provided for a winning game outcome. In yet another example, the gaming device 200 may credit a monetary amount to a financial account (not shown) associated with a player as a payout provided to a player. The financial account may be, for example, a credit card account, a debit account, a charge account, a checking account, or a casino account (e.g., an account from which the player may access cashable and/or non-cashable funds using a player tracking card or smart card).

A gaming device 200 may also include a touch screen 235 and a touch screen processor 236 associated with a primary video display 234. In one embodiment, the primary video display 234 comprises a touch screen 235. The touch screen 235 and touch screen processor 236 may be operable to communicate with a video controller 230 of the primary video display 234 and a CPU 210. Thus, a player may be enabled to indicate decisions or choices by touching the touch screen 235 in the appropriate locations.

The primary video display 234 may operate in conjunction with the video controller 230 in the CPU 210 to produce multiple separate images on the gaming device 200. Each of these separate images may originate from a separate and independent video signal. This provides significant flexibility in using a single primary video display 234 to display a plurality of separately and independently acquired images.

Plan View of a Gaming Device

Figure 3:
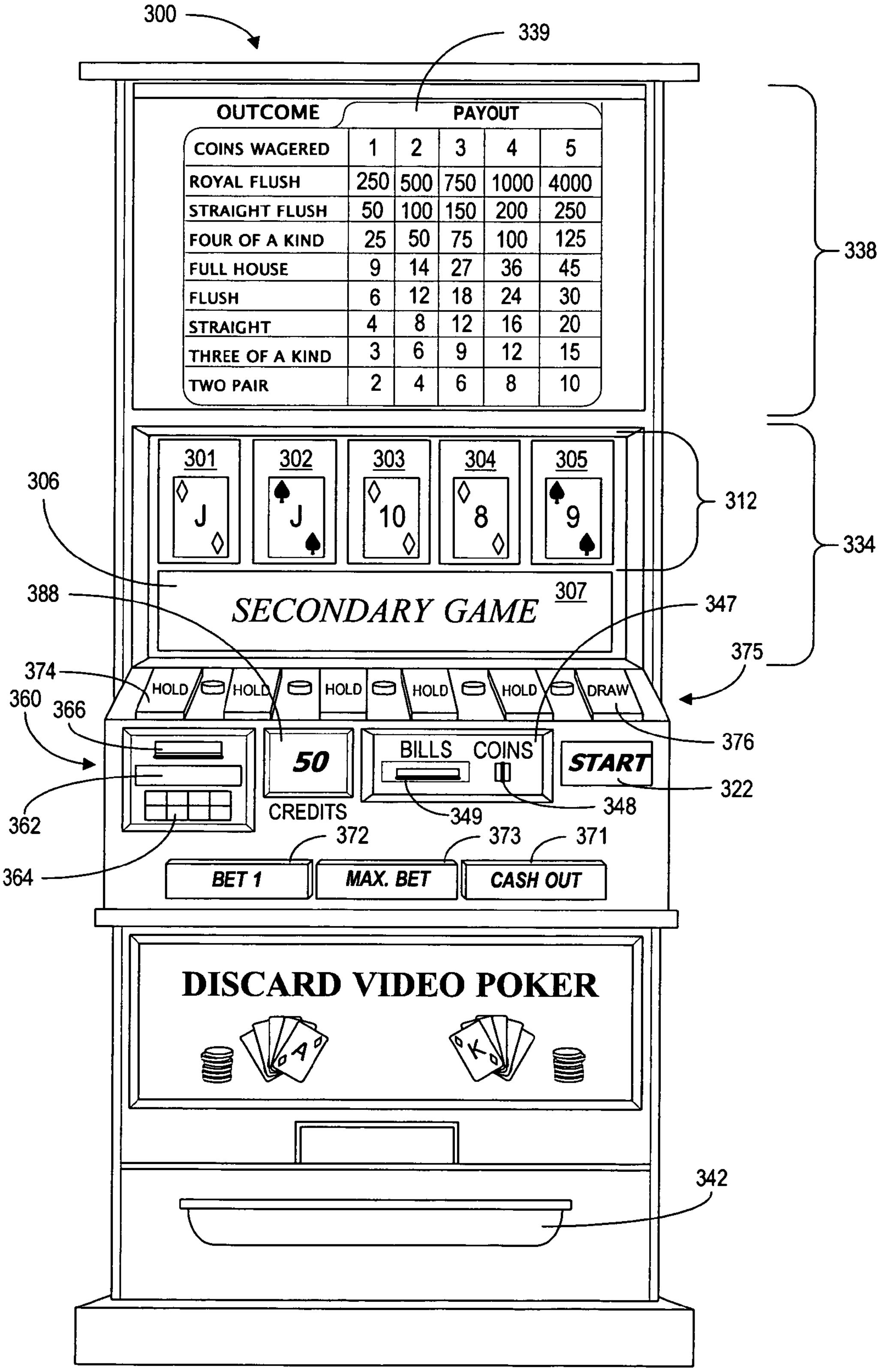
FIG. 3 is an orthographic view of one embodiment of the gaming device shown in FIG. 1 and FIG. 2.

Turning to FIG. 3, an orthographic view of a gaming device 300 is presented, in accordance with one example embodiment. The gaming device 300 may comprise, in one embodiment, for example, gaming device 200 (FIG. 2) and/or a gaming device 102 (FIG. 1). The gaming device 300 more specifically illustrates a video gaming machine or video poker gaming machine. However, in other embodiments the gaming device 300 may comprise one of various other programmable game apparatus, including a video lottery terminal. A number of peripheral components are visible on the gaming device 300 and are explained below from the view of a wagering player.

A gaming device 300 may comprise a display area in which a game outcome is displayed to the player. The display area may, for example, be a primary video display 334 that displays graphical representations of cards, reels or other indicia used to indicate a game outcome. In other gaming device 300 embodiments, the primary video display 334 may be a set of mechanical reels to display a game outcome.

The video poker gaming device 300, with the primary video display 334, may show a card hand through the various stages of a card game. For example, the video display 334 may include the initial intermediate game outcome, the held cards in the intermediate game outcome, and the final game outcome as drawn.

A secondary video display 338 of the gaming device 300 may display the contents of a payout database 339 in tabular form, a bonus game, etc. A payout database 339 in tabular form shown in FIG. 3 illustrates one embodiment of the payout database 228 of FIG. 2 or the payout database 500 of FIG. 5.

Player tracking device 360 may also be included in the gaming device 300 to allow a player to register with the gaming establishment and collect player loyalty points. The player-tracking device 360 is an example of one embodiment of the player-tracking device 260 illustrated in FIG. 2. Turning again to FIG. 3, the card reader 366 for the player-tracking device 360 may be used to identify the player with a player-tracking card, although any player identification means may be used in conjunction with player-tracking. The player may also be able to communicate with the player-tracking device 360 through a player interface 364, such as a keypad. Furthermore, the player may be able to use the player-tracking display 362 to obtain information from the player database 144 shown in FIG. 1.

Once the player has registered with the player loyalty program, a wager needs to be made in order to commence game play. It should be noted that a player need not register with a player loyalty program in order to make use of embodiments of the present invention. The gaming device 300 has a wager acceptor 347 to accept a wager to initiate game play more specifically, a coin acceptor 348 and a bill/ticket acceptor 349. The funds available for wagering are registered on the credit meter 388.

The player controls for controlling the game play are typically found on the pushbutton panel 375 and include a start button 322, a bet button 372 and 373, a hold button 374, a draw button 376. Each pushbutton control is accessible to a player during game participation for furthering game play or altering game strategies.

In order to place a bet and begin game play, the player may use the bet button 372 to bet a single credit, or bet button 373 to wager a maximum bet allowed by the gaming device 300. Once a wager has been placed, the player can start the gaming device 300 with start button 322. The game outcome is shown on the primary video display 334.

The hold button 374 and the draw button 376 are used during game play to determine indicia that are held or discarded and allow a player to implement a game play strategy. Although five individual primary card hold buttons 374 are shown, the gaming device may include more or fewer of each control type pushbutton. These buttons may be operative to play, in one embodiment, a draw type poker game.

Draw type poker games provide the player an opportunity to receive an initial set of randomly selected indicia to form an intermediate game outcome. As is conventional in the art of five-card draw poker, the player determines which cards are to be held and, thereby, which are to be discarded. This decision is conveyed to the gaming device by the player pressing the hold control buttons 374 that are associated with each card that is to be held in the primary game. In one embodiment, the intermediate game outcome reflects a first set of indicia from which the player may discard selected indicia and receive a set of replacement indicia in the hope of improving the player's game outcome. In one embodiment of draw poker, the held set of indicia from the intermediate game outcome and the replacement set of indicia form a final game outcome. The final game outcome is then evaluated to determine if a winning game outcome has resulted. If a winning game outcome has resulted, the award corresponding to the winning game outcome is provided to the player.

The game play control buttons may be used to implement player strategies revolving around the indicia to hold and the type of winning game outcome the player may decide to attempt to create. Initially, the primary game indicia positions 301 through 305 are void of playing cards, ready for playing the primary game 312. The player presses draw control button 376 signaling the gaming device 300 to deal a hand of cards to card positions 301 through 305 to create a intermediate game outcome for a primary game. After pressing draw control button 376, an intermediate primary game outcome is dealt populating all five (5) card positions of the primary game 312.

A secondary game 306 may be played based on the primary game 312. Indicia from the primary game 312 may be collected from the indicia positions 301-305, in some embodiments, and positioned in collectible indicia area 307. In some embodiments, multiple primary game outcomes may be used to potentially complete the secondary game 306 based on the collectible indicia obtained in the primary game 312 and recorded in the collectible indicia area 307.

Finally, the gaming device 300 may comprise a coin tray 342. Payment to the player may be rendered by dispensing coins into the coin tray. The player may cash out of the gaming device 300 by hitting the cash out button 371 on the pushbutton panel 375. Coins available to be cashed out are displayed on the credit meter 388 and dispensed on demand on actuation of the cash out button.

Example Description of Game Play

An example of a game play session follows to better illustrate a method of playing, in one or more embodiments, a series of individual primary games that each potentially contributes to a winning game outcome in a secondary game (such as a bonus game). This example is not meant to limit the way in which this game is played, but only to exemplify some of the basic concepts of some embodiments of the invention. As will become apparent to one skilled in the art, there are multitudes of variations that can be made from the basic concepts described and claimed herein.

Types of primary games that may be played include the common five-card draw poker game, such as "Jacks or Better" or "Double Double Bonus Poker." It is the above game play mechanic for draw poker that will be used to exemplify the process of collecting indicia for a secondary game in the embodiments to follow.

It should be understood that although the following embodiments are exemplified in the context of a draw poker game, almost any type of card game may be used in conjunction with forming a secondary game as described herein. Consequently, the game is described more generally as an individual primary game (or a series of primary games) from which specified indicia occurring in the individual primary game may be used to form a winning game outcome in a secondary game.

In the examples that follow, the term indicia is used to more generally describe symbols (e.g., cards) that in predetermined sets may form winning game outcomes. A plurality of indicia form a set of indicia. For example, a set of indicia may include in one embodiment a "standard deck of playing cards" refers to a collection of fifty-two (52) cards comprising four (4) sets of cards identified by the characters 2 through 10, Jack ("J"), Queen ("Q"), King ("K"), and Ace ("A"). Each of the four (4) sets of cards is differentiated by one of four (4) suits, namely, a spade ("s"), club ("c"), heart ("h"), or diamond ("d"). One or more Jokers may also be included for use as the highest card or as a wild card. A set of indicia may include, in one embodiment, the card deck described above; however, the present invention is not limited to the above-described card deck—any set of indicia may be used.

One or more decks can also be used in a single primary game. An "infinite" deck of playing cards refers to a deck wherein any single playing card can be dealt a repeated number of times. It should be noted that, in some embodiments of a collection-based game described herein, cards may be dealt to a primary poker hand from any number of virtual "decks" (e.g., from a virtual six-deck "shoe"). Further, an indication of a number of decks used may be output to a player.

Sets of indicia (e.g., a card deck) may be randomly selected to form subsets that determine intermediate game outcomes. These intermediate game outcomes may be further modified by discarding selected indicia from the subset. The indicia that are "discarded" may be referred to as discarded indicia. The indicia that are "held" (e.g., selected by the player as held) may be referred to as held indicia. Indicia to replace the discarded indicia may be referred to as replacement indicia. Drawn indicia may include any of the indicia in the intermediate game outcome and any of the replacement indicia. Each of these types of indicia are the basis for distinguishing various embodiments of a collection (or occurrence) based secondary game. The collectible indicia that may be used toward a winning secondary game outcome are described as follows.

In one embodiment, a series of individual primary games provides collectible indicia to a secondary game. More specifically, the secondary game, in one embodiment, involves the counting or collecting of predetermined indicia occurring in the individual primary games. The secondary game may persist or run in parallel to a primary card game such as poker type game. The number of individual primary games in the series may be predetermined or the primary individual games may be ongoing until the player decides to cash out.

Various methods of displaying collected indicia and/or totals of collected indicia (e.g., a counter) are contemplated. In some embodiments, a "collected card area" or "indicia collection area" of a display screen may display graphic images or text indicating one or more collected cards. In other embodiments, an LED meter may depict a "collection total" associated with one or more cards (e.g., a meter adjacent to text reading "Collected Hearts Total" reads "27").

A secondary game pay table provides, in one embodiment, an award based on the number of collectible indicia that occurred in the primary games that are collected in the secondary game. This secondary game pay table may be stored as a secondary game pay table database in the payout database 228 shown in FIG. 2. Additionally, payouts may be awarded in "tiers" for achieving various goals (or thresholds) of a predetermined number of primary games. For example, a player may be awarded a jackpot of 10,000 coins for collecting 12 discarded Aces in six hands, or smaller payouts of 200 coins for collecting eleven Aces, and 25 coins for collecting ten Aces in twelve consecutive primary games.

The indicia that may be collected for the secondary game may be controlled, or restricted, to selected subsets of the indicia that are present in the primary game. The discussion that follows describes potential restrictions on collectible indicia that may be incorporated into game play in some embodiments.

Collectible Indicia

As described above, in various embodiments, the secondary game may act as a bonus feature and may be occurrence-based. For example, the goal of the game may be to collect certain indicia or groups of indicia for use toward a winning game outcome in the secondary game. Several embodiments are contemplated in this regard.

For example, the goal of the game may be to collect as many "Hearts" as possible during a course of a session, and a secondary payout at the end of the session may be based on the number of Hearts collected (e.g., a player collecting a number of Hearts within a first range may receive a first payout amount, a player collecting a number of Hearts within a second range may receive a second payout amount, i.e., a player is paid 10 coins after collecting 50 Hearts, 20 coins after collecting 200 Hearts). Any type, group or designation of cards may be collected in this regard (e.g., players collect "Hearts", "face cards", "Aces", "odd-numbered-cards", "Queen of Diamonds" and so on). The total count of the collectible indicium determines, in some embodiments, if any award is won—and the award amount or type of award if the total count meets a predetermined threshold.

In some embodiments, players collect a predetermined threshold number of cards to receive a secondary payout, and this may occur repeatedly (e.g., each time a player collects 50 Spades, the player is awarded a payout, and a collection total is reset to 0). In other embodiments, players collect various combinations of cards in order to receive a payout (e.g., players may collect all four Ace cards, collect every diamond card, etc.). In one example, players collect one of every card in a standard 52-card deck. In another example, players collect ten cards of each suit. In yet another example, players collect 11 Aces, ten Kings, ten Queens, ten Jacks, ten 10s, nine 9s, and so on.

Counted Collectible Indicia

The collectible indicia that are counted in individual primary games differ dependent upon the embodiment of the invention. Various methods of "collecting" occurrences of collectible indicia from primary games for a secondary game are contemplated. For example, the indicia that are counted in the individual primary games may depend on the method of acquisition or disposition of the indicia.

Distinguishing a number of embodiments are restraints that may be placed on the sets and subsets of indicia from which collectible indicia may be collected. In the exemplary primary game illustrated by the 5-card draw poker game described above, there are several sets of indicia that may be individually categorized. For example, there is a subset of indicia that includes all held indicia, another all discarded indicia. Furthermore, there is a group of cards that includes all the drawn cards (i.e., all the indicia forming the intermediate game outcome and all the indicia drawn to replace any discarded indicium from the intermediate game outcome). Each of these restraints on collectible indicia are described as follows.

Discarded Indicia as Collectible Indicia

Figure 6A:
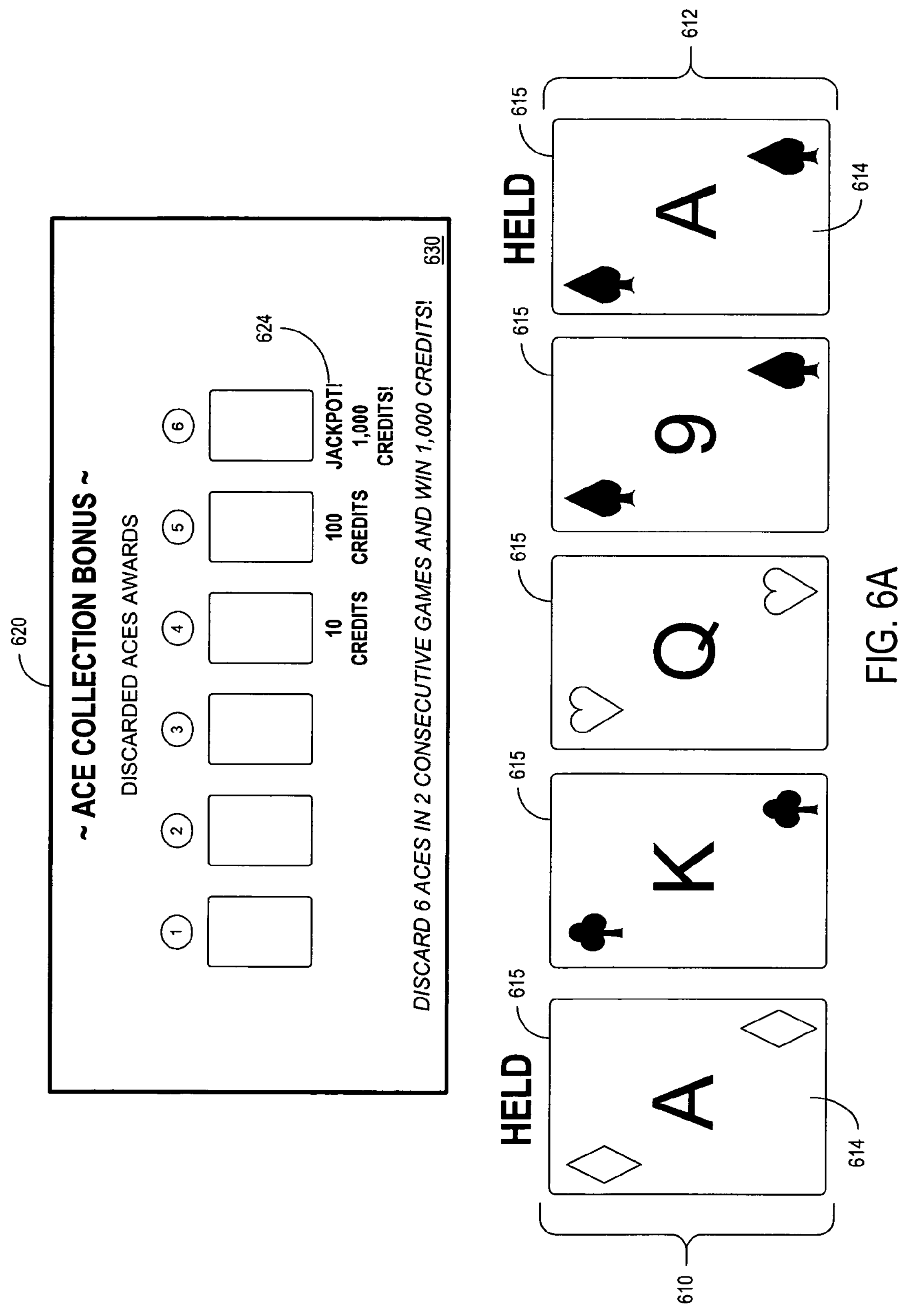
FIG. 6A is an example of an intermediate game outcome using discarded indicium in a secondary game.

For example, in certain embodiments, only discarded cards may be considered collectible (e.g., in order to have a dealt Ace "collected", the player must decide to discard the card). This method of collecting indicia is illustrated in FIG. 6. Turning to FIG. 6A, an example intermediate primary game outcome 610 is shown to exemplify one embodiment of the secondary game operation in conjunction with a card game. FIG. 6 illustrates a primary video game display 600 having a primary game 610 and a secondary game 620. For the purposes of this example, it will be assumed that any Ace is a collectible indicium.

Figure 6B:
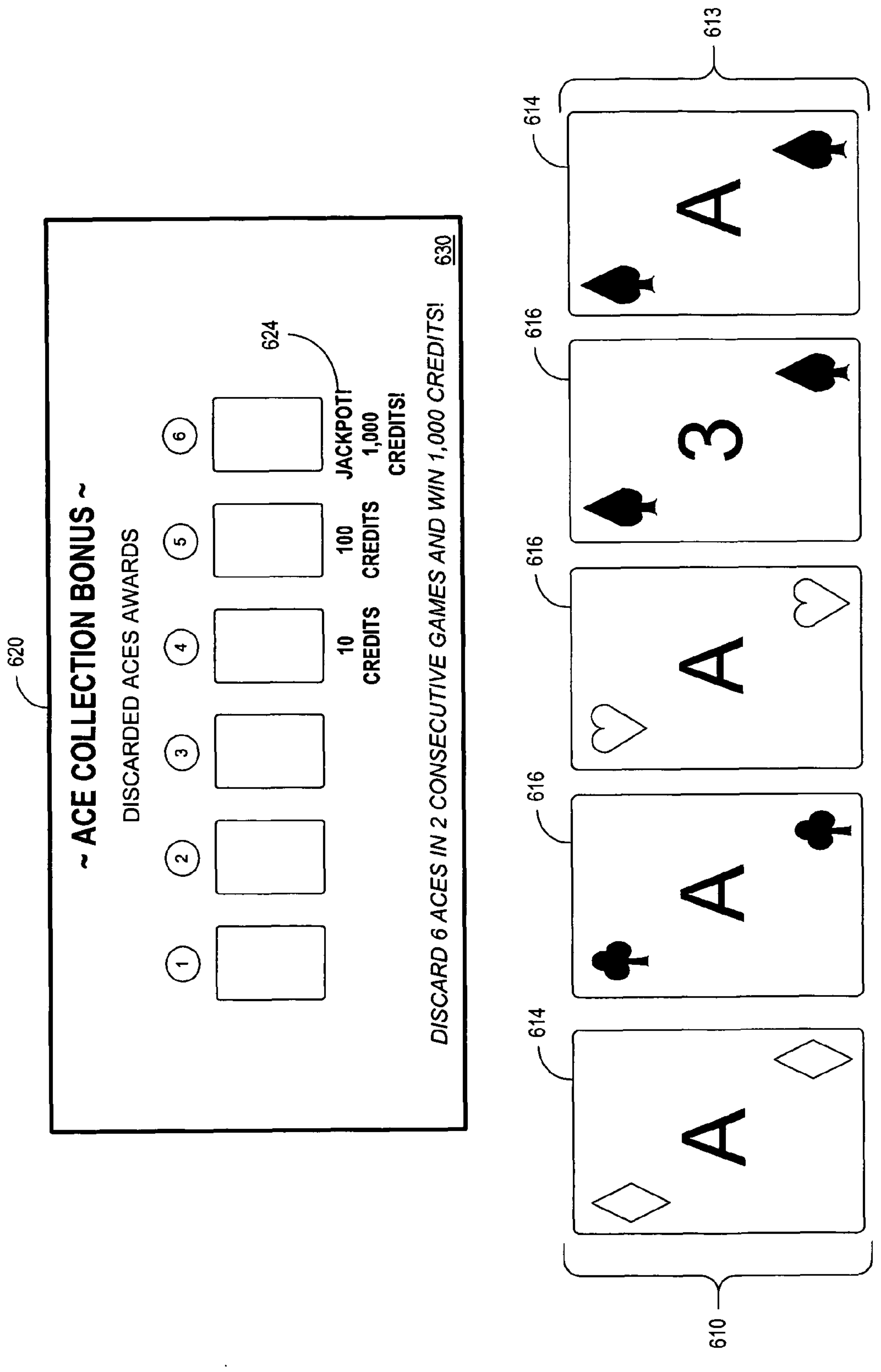
FIG. 6B is an example of a final game outcome for the intermediate game outcome shown in FIG. 6A.

FIG. 6A illustrates one embodiment of an exemplary intermediate game outcome 612 in the first individual primary game in a series of two. In this embodiment, only discarded collectible indicia may be collected in the secondary game 620. In this example, the collectible indicia (Aces) are not held in the primary game 610 and consequently, no collectible indicia are collected in the secondary game 620. FIG. 6B is a continuation of the game play of FIG. 6A, illustrating an exemplary final game outcome for the first primary game 610. The player has a winning game outcome in the primary game 610 (four Aces) for which a corresponding award is paid.

Figure 6C:
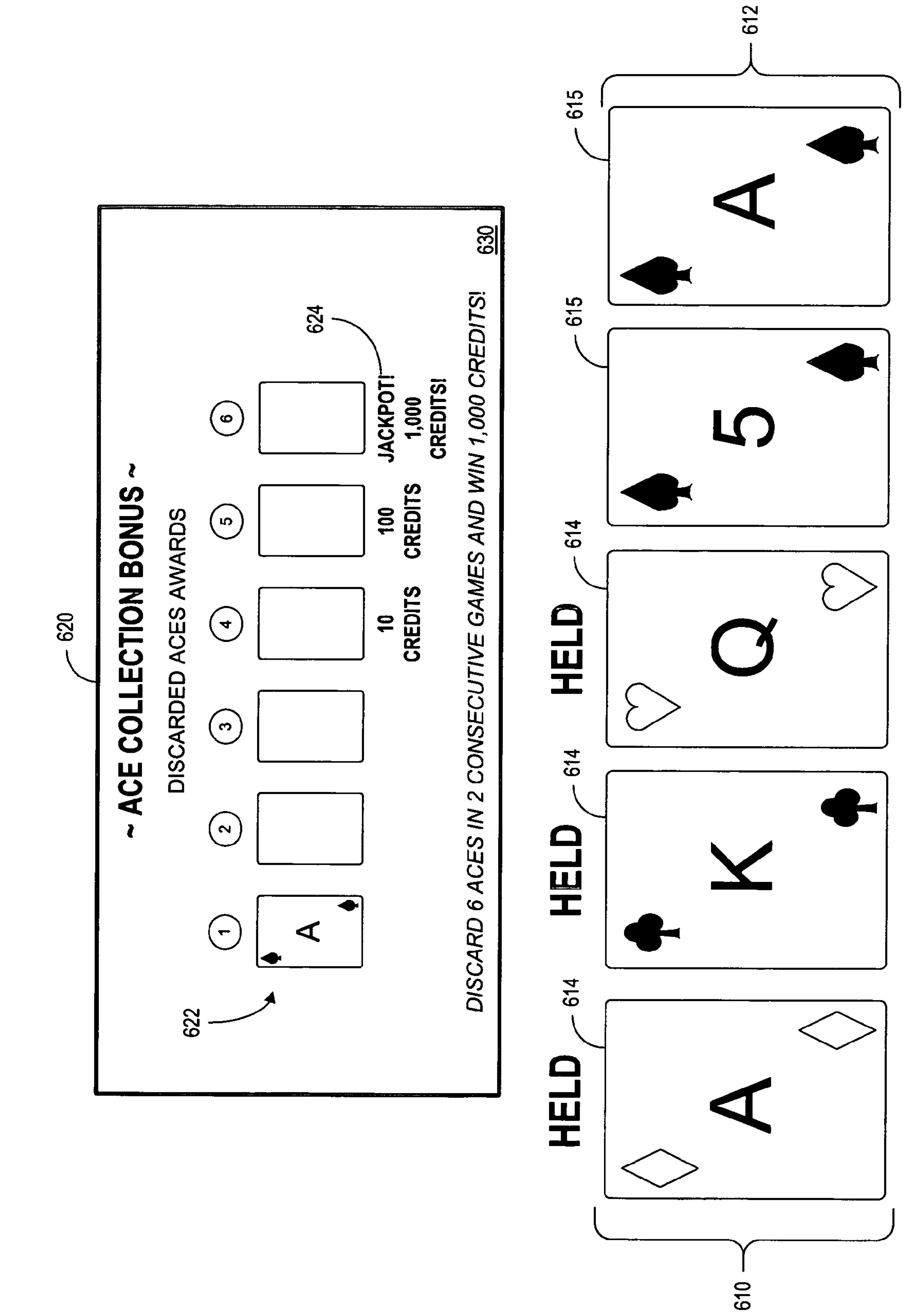
FIG. 6C is an example of a continuation of the gaming session of FIG. 6A and FIG. 6B showing an intermediate game outcome in a second individual primary game in the gaming session using drawn indicium in a secondary game.

FIG. 6C illustrates one embodiment of an exemplary second primary game in the series of two primary games in a continuation of the game play from FIGS. 6A and 6B. In the second primary game 610, the player has selected to hold an Ace, a King, and Queen to form a partial straight in accordance with the pay table, and discard the Ace of Spades. Through the discard of the Ace of Spades, the Ace of Spades becomes collectible and is shown in the secondary game 620 as a collectible indicium 622.

Figure 6D:
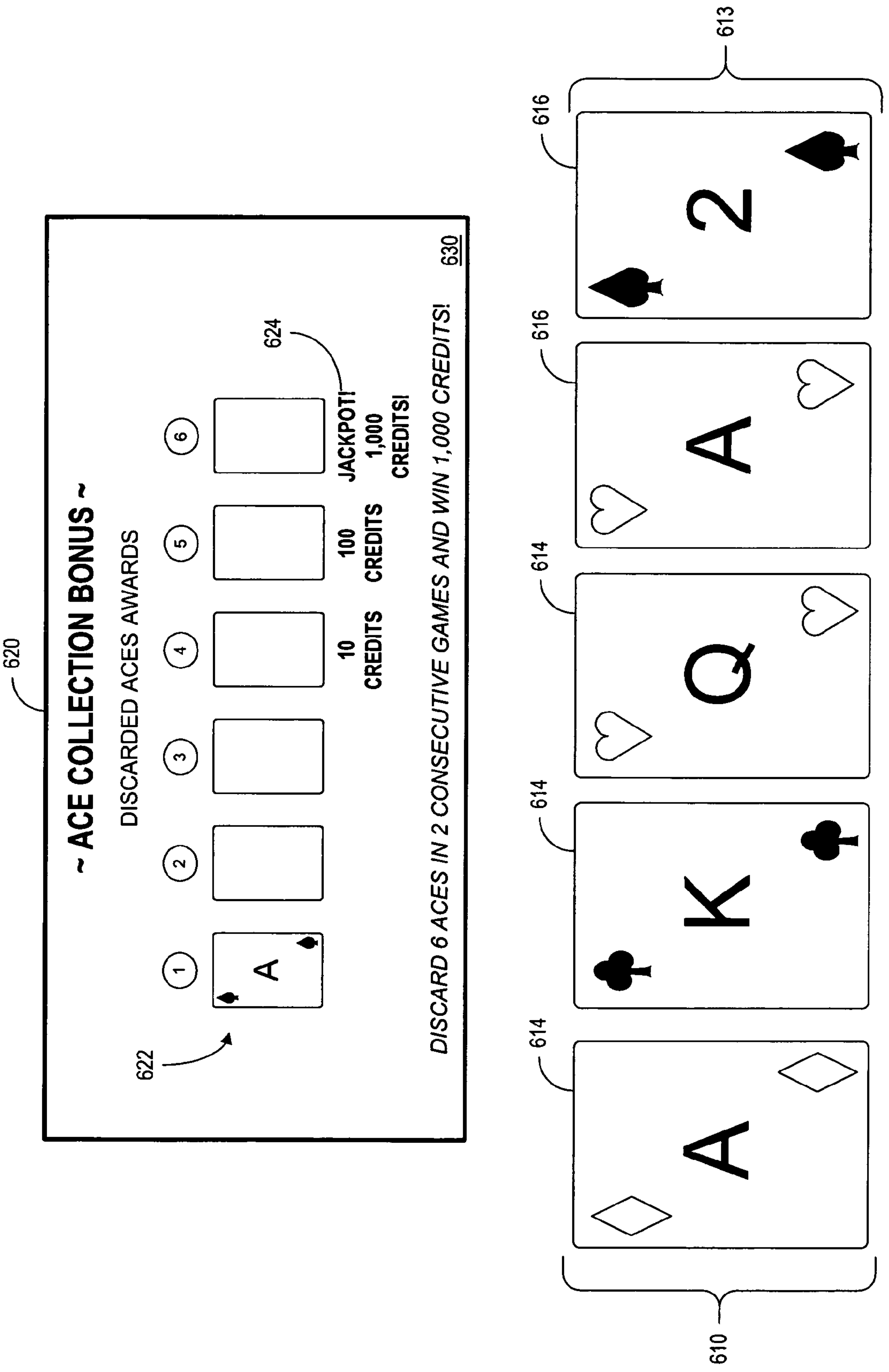
FIG. 6D is an example of a final game outcome for the intermediate game outcome shown in FIG. 6C.

The final game outcome and the secondary game outcome are shown in FIG. 6D. As can be seen from the secondary game 620, the player has not collected sufficient Aces to become eligible for a secondary award. The player has received a pair of Aces in the primary game and is paid the corresponding award for the winning game outcome in the primary game 610.

Held Indicia as Collectible Indicia

In still further embodiments, only held cards may be considered collectible (e.g., in order to have a dealt Ace "collected", the player must decide to hold the card). This method of collecting indicia is illustrated in FIG. 7. FIG. 7 illustrates one embodiment of an exemplary game display 700 having a primary game 710 and a secondary game 720 wherein Aces are collectible indicia.

Figure 7A:
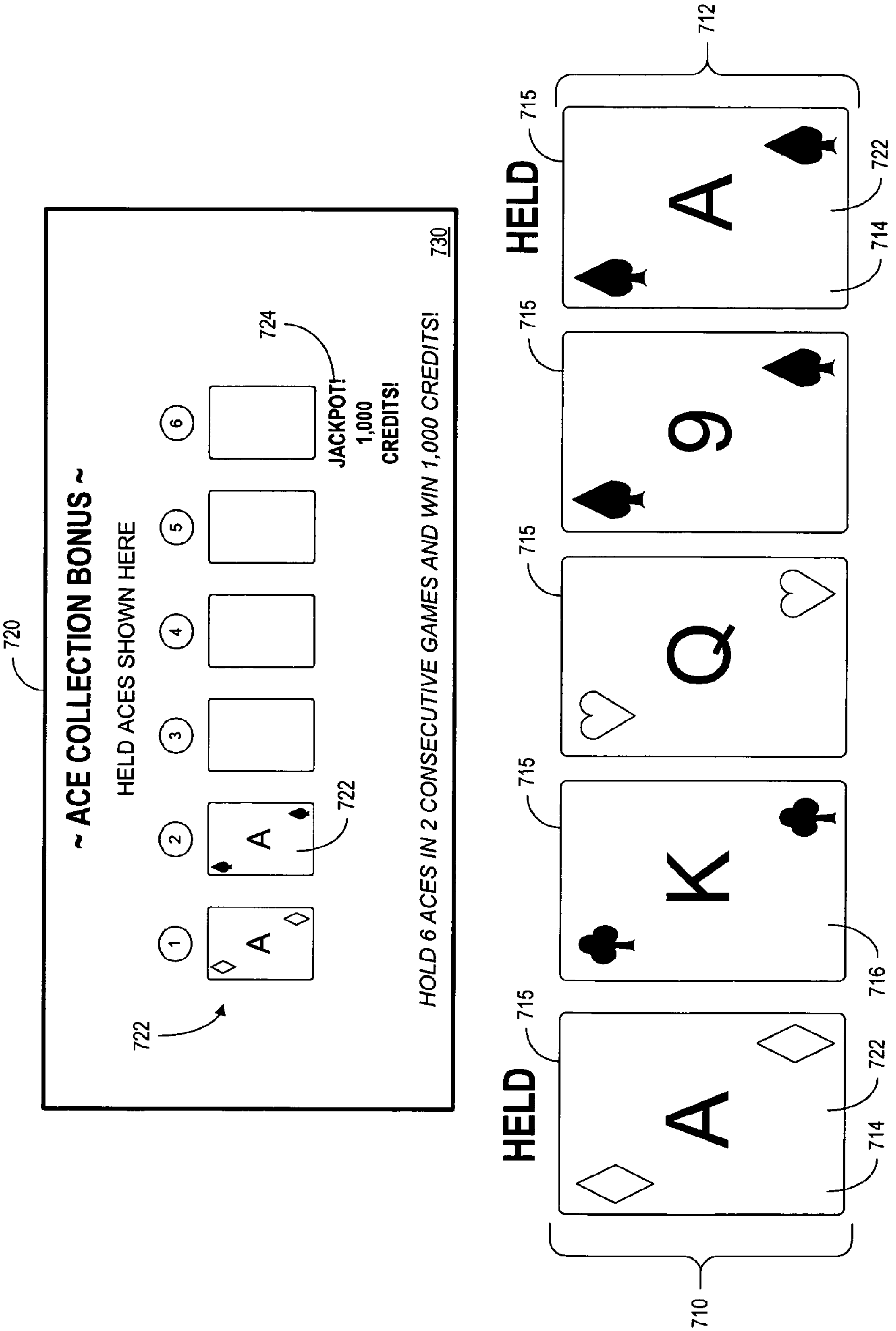
FIG. 7A is an example of an intermediate game outcome using held indicium in a secondary game.

FIG. 7A illustrates one embodiment of an exemplary intermediate game outcome 712 in the first individual primary game in a series of two. In this embodiment, only held collectible indicia may be collected in the secondary game 720. In this example, the collectible indicia (Aces) are held in the primary game 710 as the pair of Aces provides at least a pair for a winning primary game outcome with the potential for building a three of a kind game outcome. Consequently, the Ace of Diamonds and the Ace of Spades are collectible indicia and are shown in the secondary game display 720.

Figure 7B:
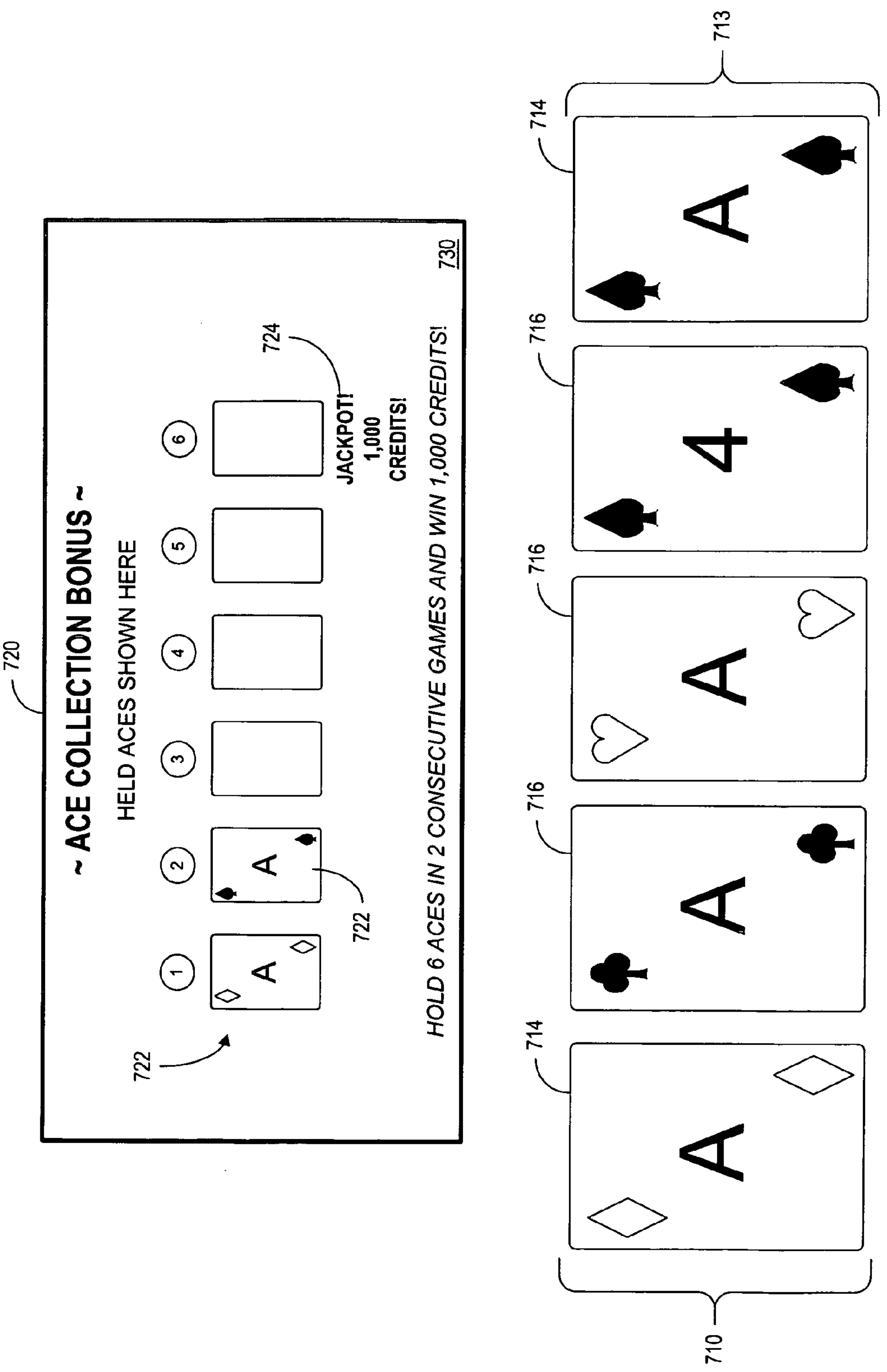
FIG. 7B is an example of a final game outcome for the intermediate game outcome shown in FIG. 7A.

FIG. 7B is a continuation of the game play of FIG. 7A illustrating an exemplary final game outcome wherein the player has acquired two more Aces (Ace of Clubs and the Ace of Hearts). Consequently, the player has obtained a four of a kind in the primary game 710 and is paid accordingly for the corresponding winning game outcome. The additional two Aces are obtained as replacement indicia in the final game outcome are not considered, in this embodiment, as held collectible indicia. Consequently, the secondary game display 720 has collected only two Aces in the display.

Figure 7C:
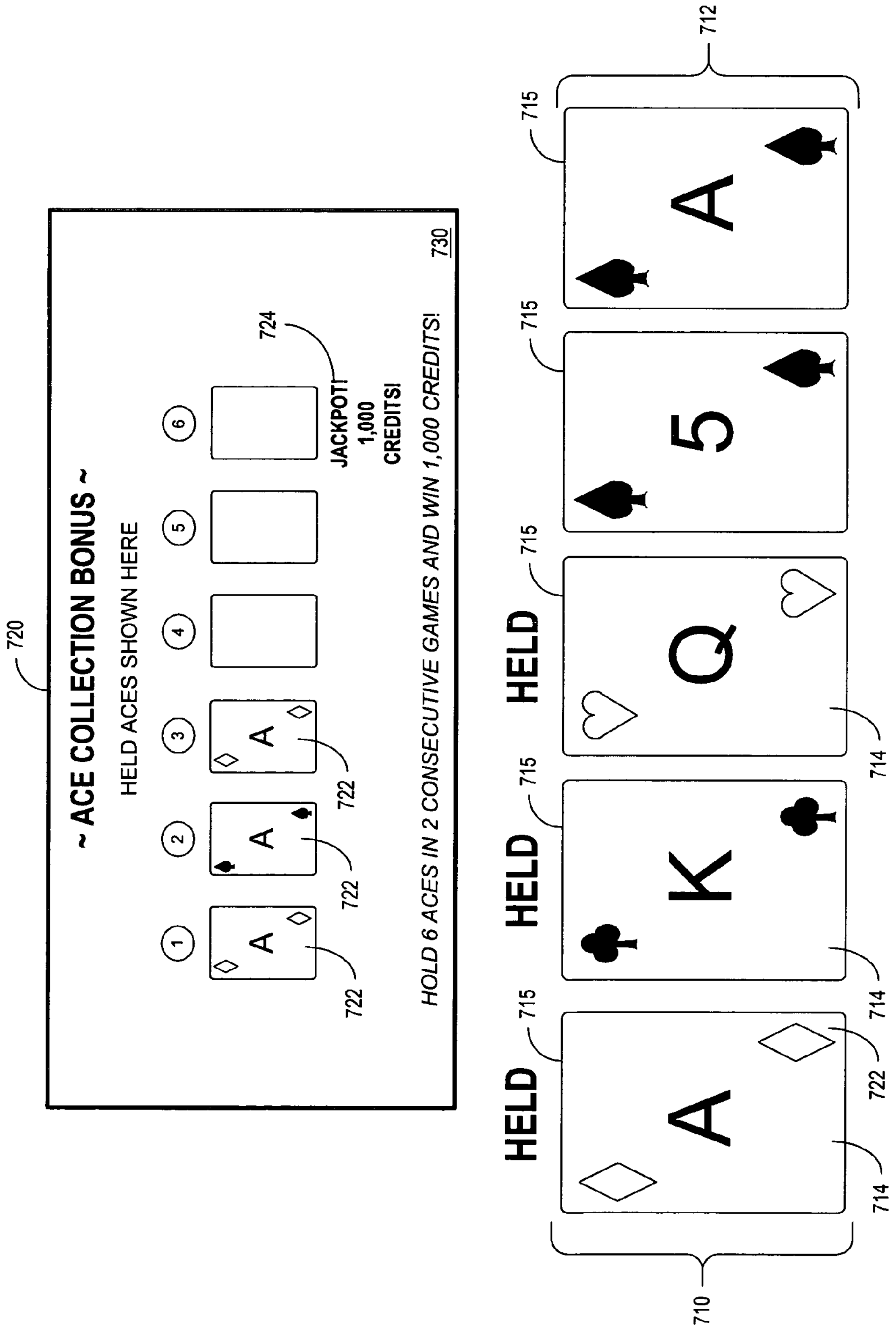
FIG. 7C is an example of a continuation of the gaming session of FIG. 7A and FIG. 7B showing an intermediate game outcome in a second individual primary game in the gaming session using drawn indicium in a secondary game.

FIG. 7C illustrates one embodiment of an exemplary second primary game in the series of two primary games in a continuation of the game play from FIGS. 7A and 7B. FIG. 7C illustrates a new randomly selected subset of indicia from the set of indicia in an intermediate game outcome. In this case, in the second primary game 710, the player has selected to hold an Ace, a King, and Queen to form a partial straight in accordance with the pay table, and discard the Ace of Spades. The player is only entitled to collect the Ace of Diamonds, as it is the only Ace that is held in the primary game 710. The Ace of Spades, because it is discarded and not held, is not eligible to be recorded as a collectible indicium in the secondary game register. Consequently, only the Ace of Diamonds appears in the secondary game display 720.

Figure 7D:
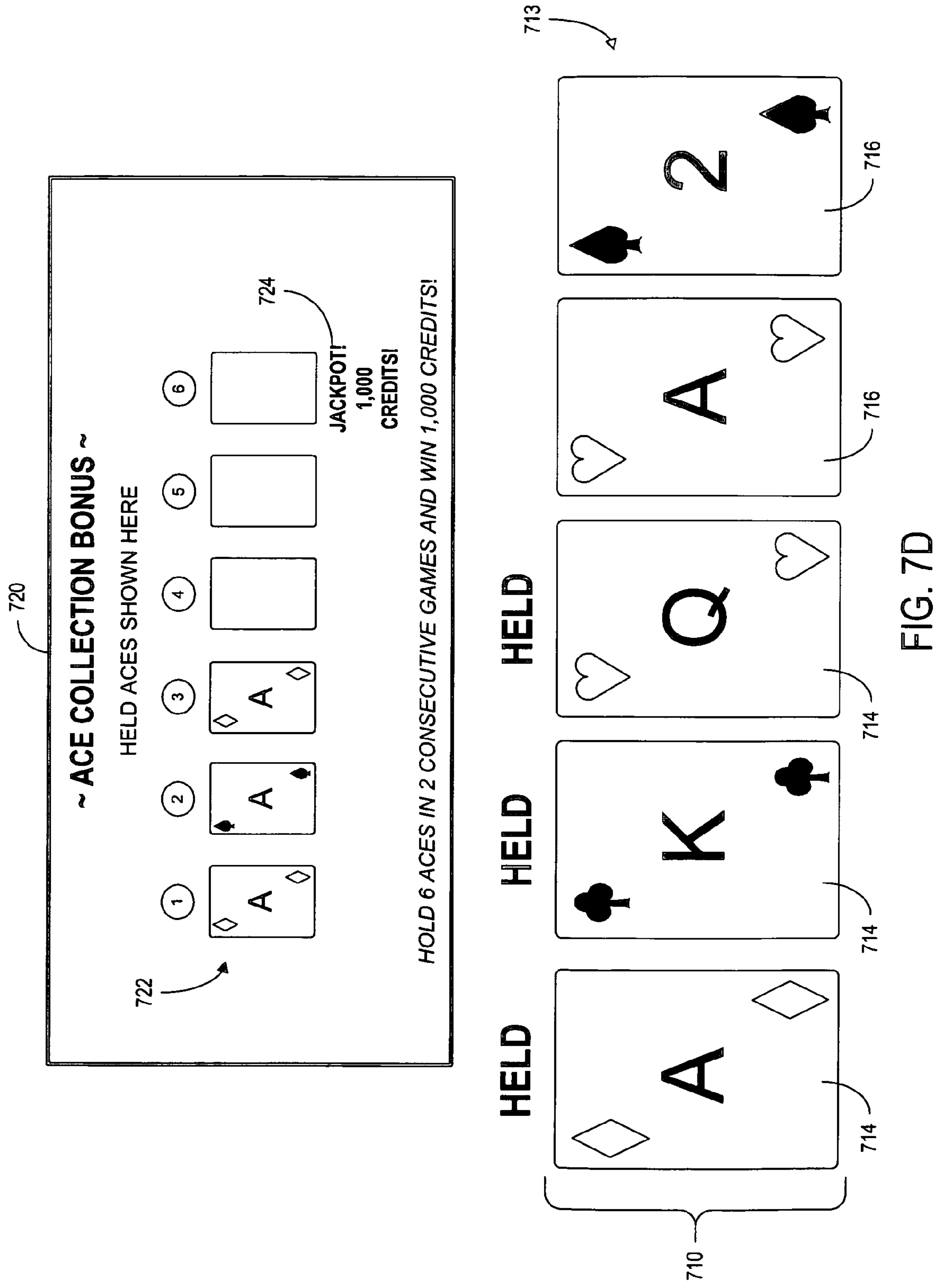
FIG. 7D is an example of a final game outcome for the intermediate game outcome shown in FIG. 7C.

The final game outcome and the secondary game outcome are shown in FIG. 7D. As can be seen from the secondary game 720, the player has not collected sufficient Aces to become eligible for a secondary award. The player has received a pair of Aces in the primary game and is paid the corresponding award for the winning game outcome in the primary game 710.

Drawn Indicia as Collectible Indicia

In still further embodiments, any drawn cards may be considered collectible (e.g., if the indicium is dealt into the intermediate game outcome or the final game outcome, the indicia are collectible). For example, in one or more embodiments, each card dealt to a player may be considered "collectible" (e.g., if the goal of a collection-based bonus feature is to collect Hearts, each Heart card dealt to a player may be duplicated and displayed as a collected card or otherwise added to a collection total).

This method of collecting indicia is illustrated in FIG. 8. FIG. 8 illustrates one embodiment of an exemplary game display 800 having a primary game 810 and a secondary game 820 wherein Aces are collectible indicia.

Figure 8A:
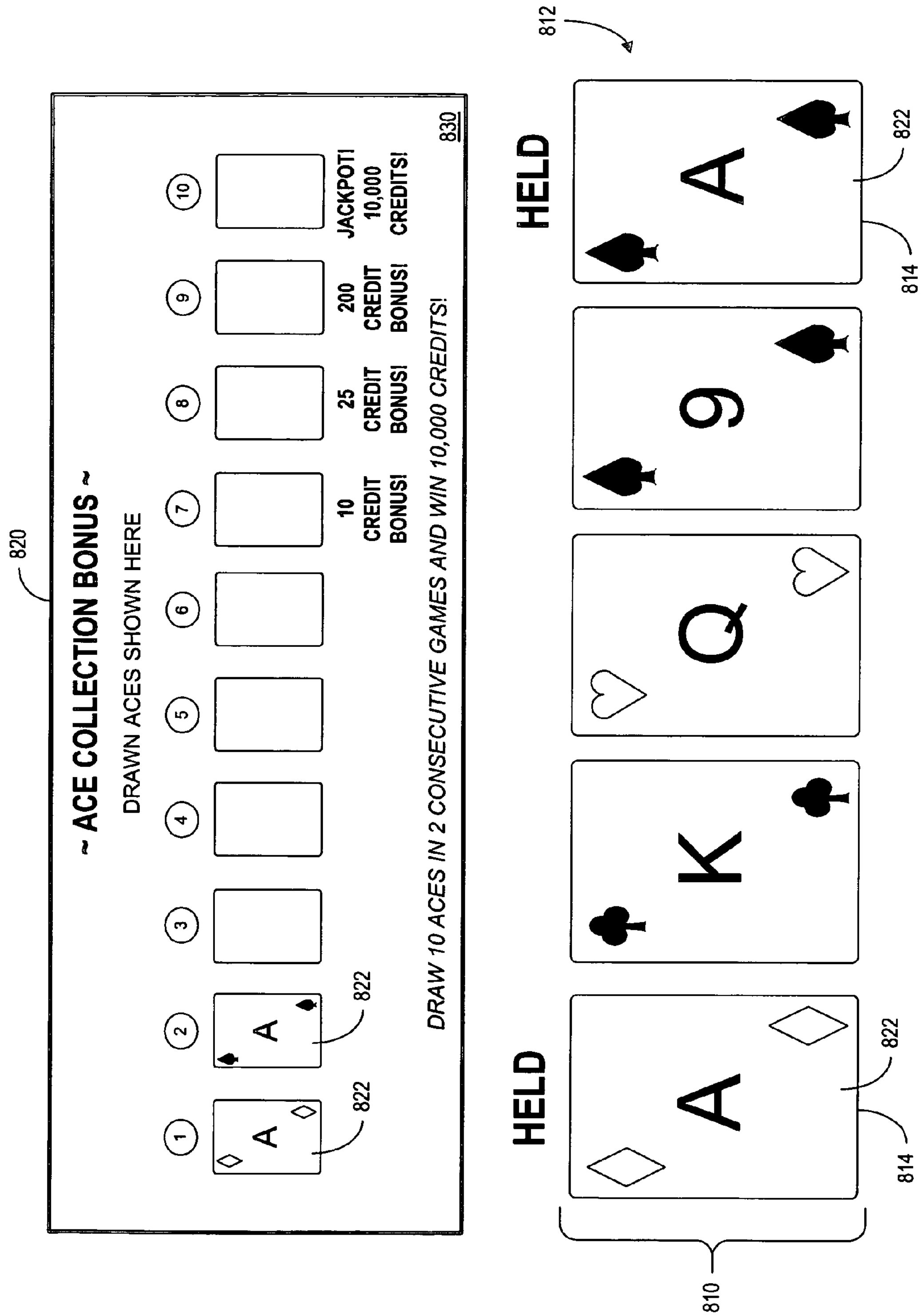
FIG. 8A is an example of an intermediate game outcome using drawn indicium in a secondary game.

FIG. 8A illustrates one embodiment of an exemplary intermediate game outcome 812 in the first individual primary game in a series of two primary games. In this embodiment, any drawn collectible indicia may be collected in the secondary game 820. In this example, the collectible indicia are the Aces in the intermediate game outcome. Consequently, the Ace of Diamonds and the Ace of Spades are collectible indicia and are shown in the secondary game display 820.

Figure 8B:
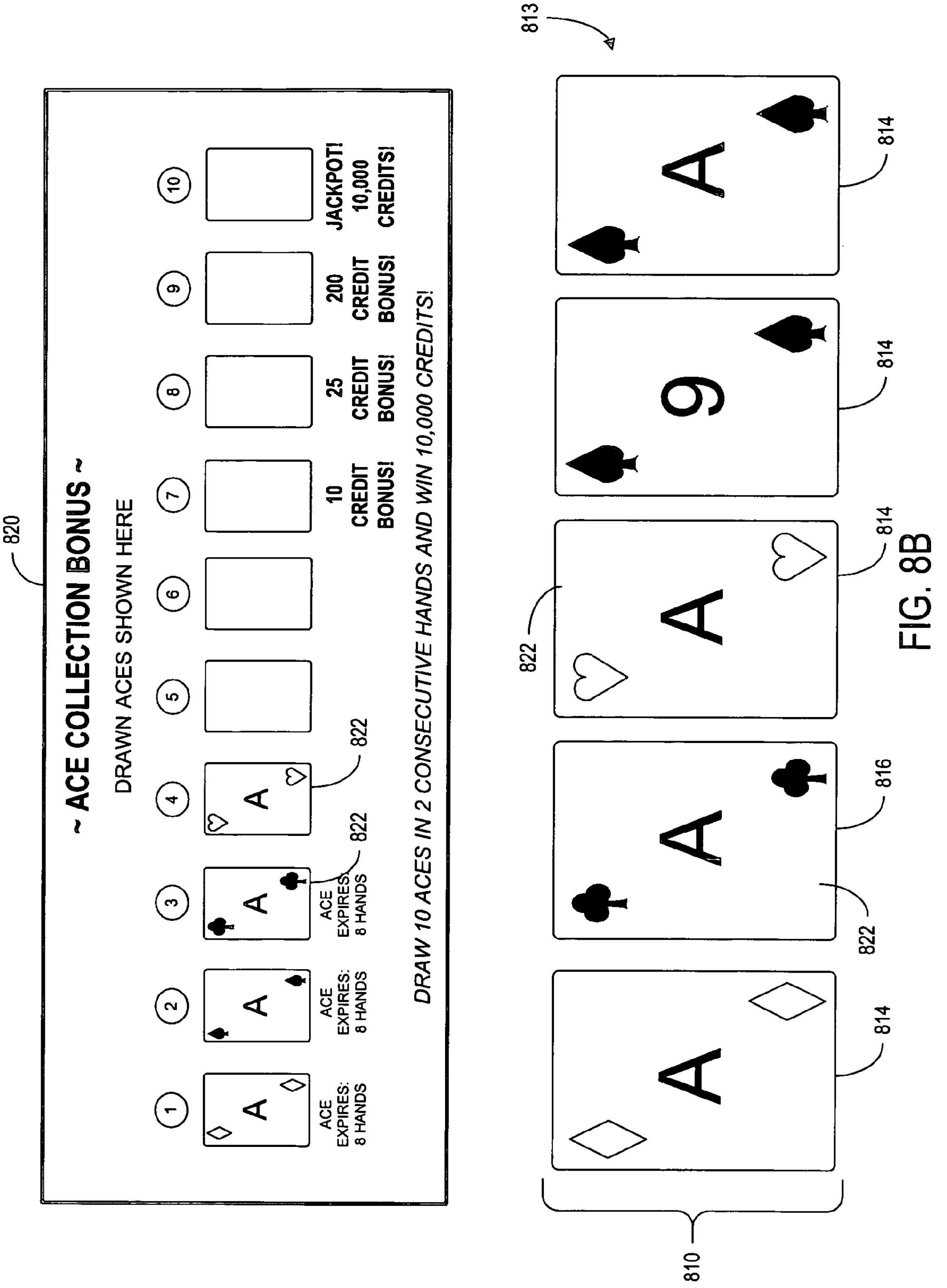
FIG. 8B is an example of a final game outcome for the intermediate game outcome shown in FIG. 8A.

FIG. 8B is a continuation of the game play of FIG. 8A, illustrating one embodiment of an exemplary final game outcome wherein the player has acquired two more Aces (Ace of Clubs and the Ace of Hearts) as replacement indicia. Consequently, the player has obtained a four of a kind in the primary game 810 and is paid per the pay table according to this corresponding winning game outcome. The additional two Aces obtained as replacement indicia in the final game outcome are also collectible indicia as they were drawn as replacement indicia for the discarded indicia in the intermediate game outcome. Consequently, the secondary game display 820 has collected four Aces in the display as shown.

Figure 8C:
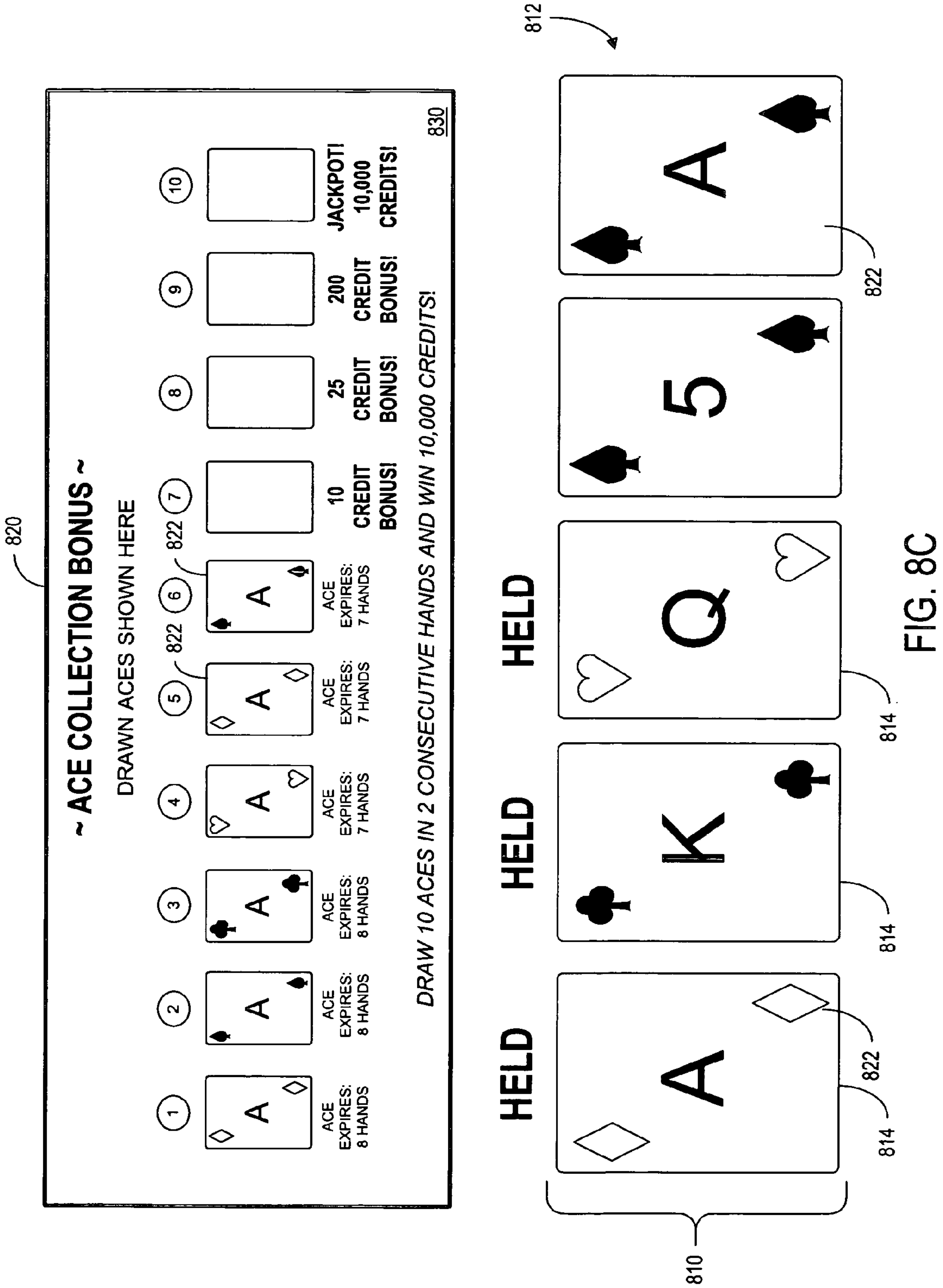
FIG. 8C is an example of a continuation of the gaming session of FIG. 8A and FIG. 8B showing an intermediate game outcome in a second individual primary game in the gaming session using drawn indicium in a secondary game.

FIG. 8C illustrates one embodiment of an exemplary second primary game in the series of two primary games in a continuation of the game play from FIGS. 8A and 8B. FIG. 8C illustrates one embodiment of an exemplary randomly selected set of indicia to form an intermediate game outcome. In this case, in the second primary game 810, the player has selected to hold an Ace, a King, and Queen to form a partial straight in accordance with the pay table, and discard the Ace of Spades. The player is entitled to collect the Ace of Diamonds and the Ace of Spades. Each of these Aces is shown recorded in the secondary game display 820.

Figure 8D:
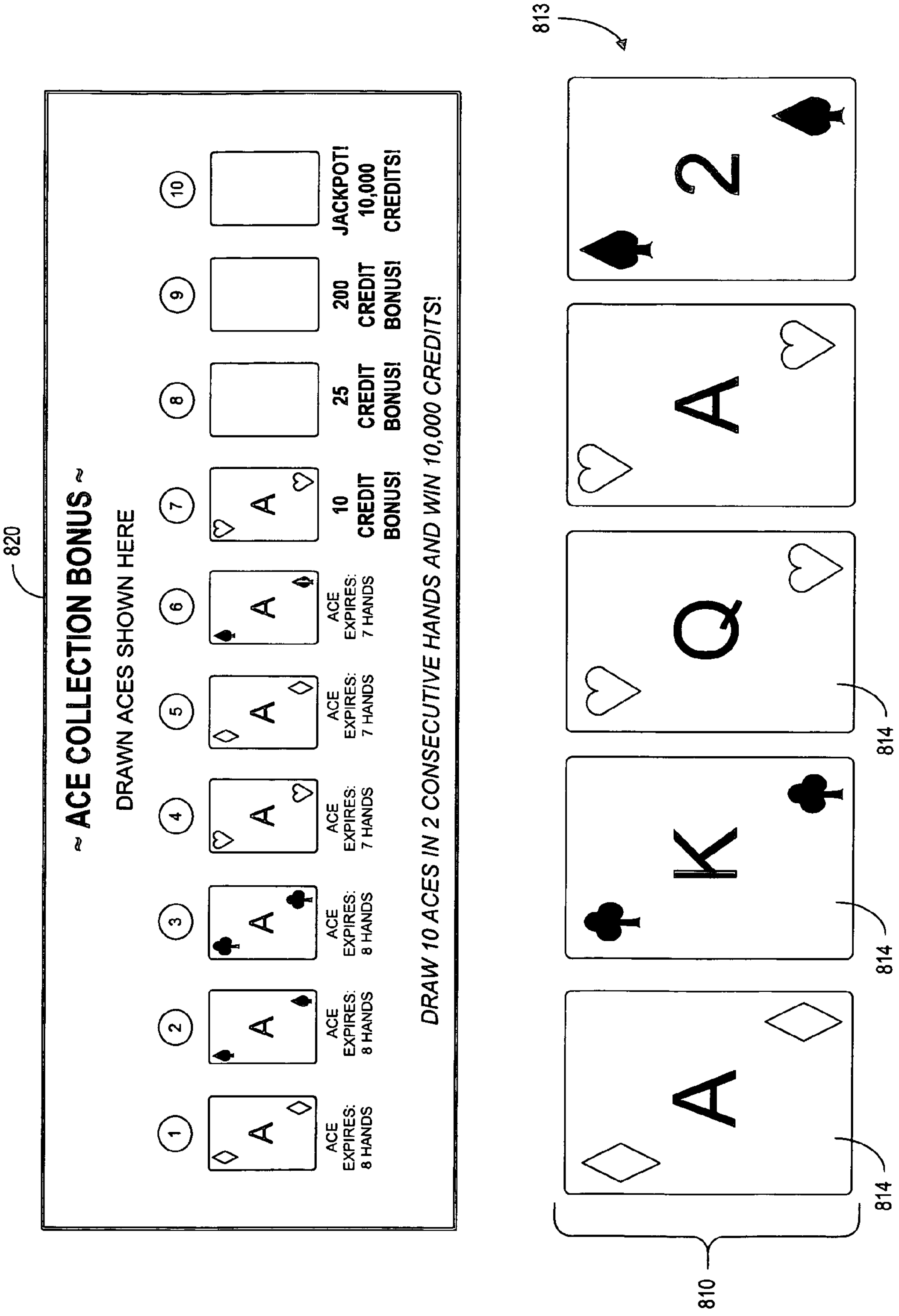
FIG. 8D is an example of a final game outcome for the intermediate game outcome shown in FIG. 8C.

An exemplary final game outcome and secondary game outcome as a continuation of the game play of FIG. 8C is shown in FIG. 8D. The player has received as a replacement card the Ace of Hearts and the two of Spades. As a result, the primary game outcome is a pair of Aces providing a winning game outcome of a single pair and the corresponding award from the payout table. Because the Ace of Hearts was drawn as a replacement indicium for the intermediate game outcome, the Ace of Hearts is a collectible indicia and added to the secondary game display. As can be seen from the secondary game 820, the player has obtained sufficient collectible indicia (Aces) to become eligible for a secondary award—a ten credit bonus.

Limiting Potential Accumulation of Collectible Indicia

In addition to determining collectible indicia that may be counted, the number of primary games that may contribute collectible indicia to the secondary game may also be predetermined in some embodiments, or alternatively, methods developed for limiting the total accumulated collectible indicia in ongoing primary games.

In order to more closely control the payback percentage of the game, and yet still provide enticing awards, it may be advisable to limit the potential awards paid out in the secondary game. Without these limitations, the player could continuously collect indicia that could be redeemed for a secondary award. Two methods are described below that take two distinct approaches to controlling the payback percentage of the game.

Flat Rate Gaming Session

In one or more embodiments, play of a video poker game may be session-based (e.g., such that players pay a flat price and in exchange are allowed to execute repeated game plays without providing additional funds). For example, a video poker game may be offered as a flat rate session with an additional bonus feature to players who make such a purchase. Apparatus and methods which, among other things, permit and enable prepaid or flat-rate play sessions, and which are appropriate for use in some embodiments of the present invention are disclosed in U.S. Pat. No. 6,077,163, filed Jun. 23, 1997, entitled "GAMING DEVICE FOR A FLAT RATE PLAY SESSION AND A METHOD OF OPERATING SAME"; U.S. patent application Ser. No. 10/001,089, filed Nov. 2, 2001, entitled "GAME MACHINE FOR A FLAT RATE PLAY SESSION AND METHOD OF OPERATING SAME"; and U.S. patent application Ser. No. 10/842,066, filed Apr. 21, 2003, entitled "METHOD AND APPARATUS FOR EMPLOYING FLAT RATE PLAY"; the entirety of each are incorporated herein by reference for all purposes.

Consequently, in addition to specifying the collectible indicia that may be counted in the individual primary game, at least some embodiments also require that the number of individual primary games during which collectible indicia may be accumulated is finite. The actual number of individual primary games may be predetermined by a flat rate gaming session that specifies duration of game play. The player may purchase a flat rate gaming session with a duration measured by a predetermined time (e.g., all the individual primary games that the player may play in 10 minutes). Alternately, the player may purchase a gaming session with a duration measured by a predetermined number of game outcomes (e.g., the player purchases 10 individual primary games). In either case of the flat rate gaming sessions, the number of individual primary games is finite, and limits the accumulation of collectible indicia to the duration of the gaming session.

Collectible Indicia from Discarded Indicia in a Flat Rate Gaming Session

Figure 9A:
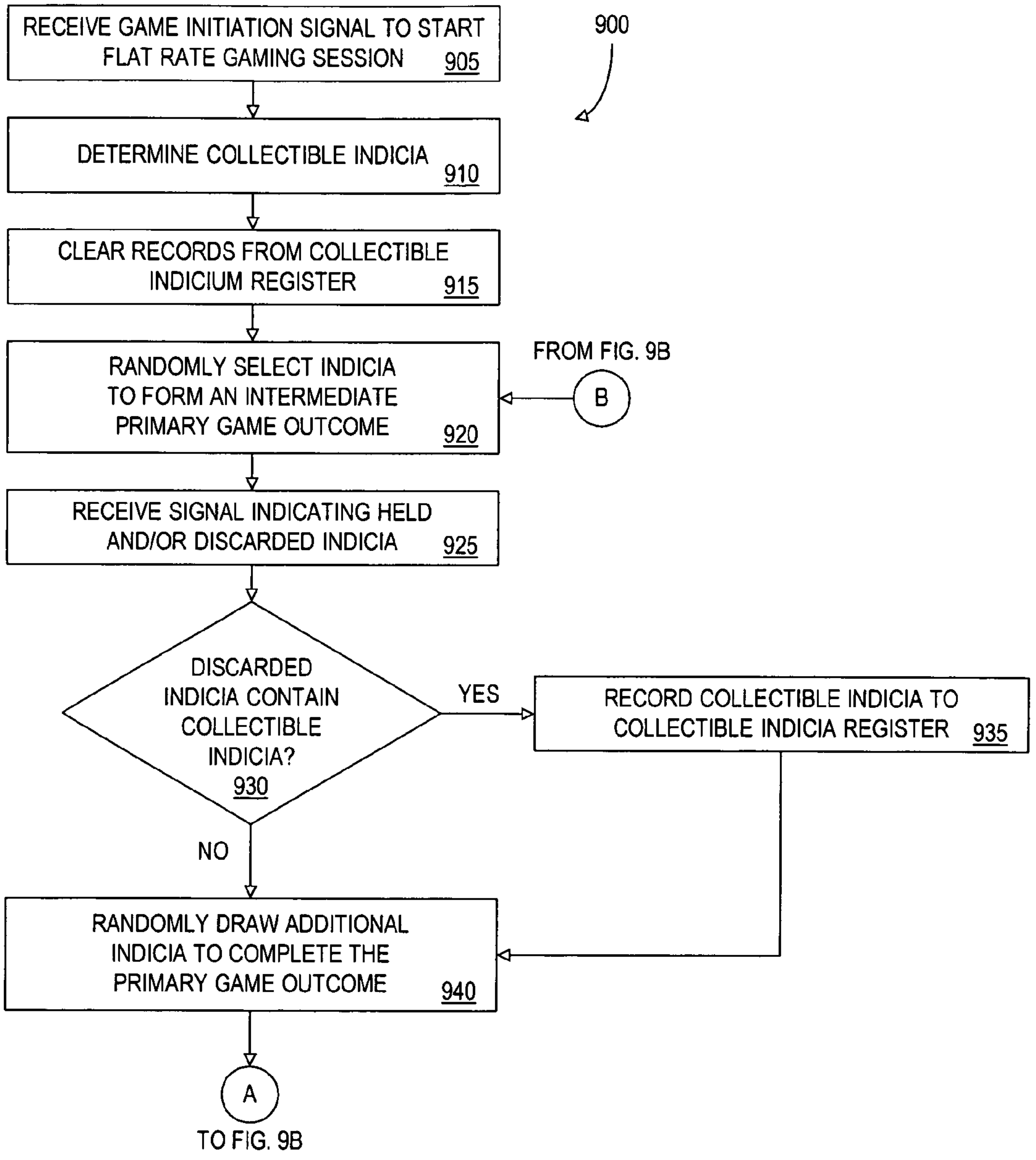
FIG. 9 is a flow chart illustrating, in one embodiment, the process of using a finite series of primary games to populate a secondary game with discarded indicia from the primary games.
Figure 9B:
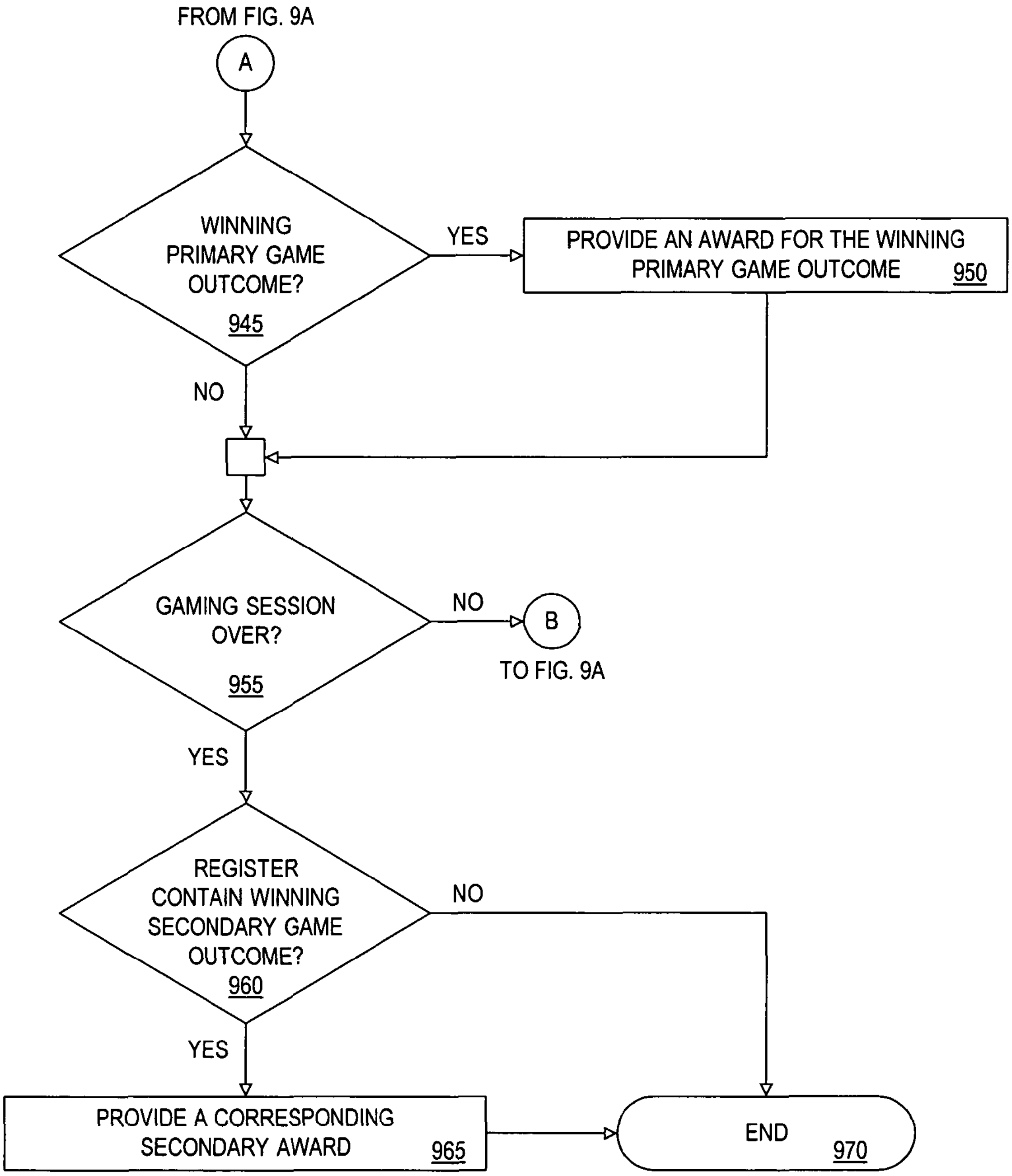

In one embodiment of a flat rate gaming session, discarded indicia are the only collectible indicia that may be recorded to the register for determining a secondary winning game outcome. FIG. 9 illustrates this process in a finite gaming session as an exemplary embodiment of this game play mechanic. The process of FIG. 9 may be applied, in one embodiment, to the gaming device 200 of FIG. 2 or of the gaming device 300 in FIG. 3 as follows.

The gaming device recognizes a wager to purchase a flat rate gaming session in step 905. The flat rate gaming session may have either a predetermined number of game plays or a predetermined time duration. The game program may have a predetermined designated collectible indicium, or in some embodiments, the player may designate a collectible indicium in step 910. In step 915, a register for recording each collectible indicium as it occurs is set to zero. If desired, in some embodiments, a multiple indicia may be designated as collectible. The gaming device then randomly selects indicia to form an intermediate primary game outcome in step 920. The player may then designate indicia to be held (or discarded) from the intermediate game outcome in step 925. At this juncture, the gaming device determines whether any of the discarded indicia contain collectible indicia in step 930. If collectible indicia are discarded in step 930, these collectible indicia are recorded to the register of collectible indicia from each of the previous games in the flat rate gaming session in step 935. After the register is incremented appropriately in step 935, or if no discarded indicia contain collectible indicia, additional indicia are randomly drawn to complete the intermediate game outcome to form a final game outcome in step 940. If the game outcome is a winning game outcome as determined in step 945, an award is provided in step 950 for that winning game outcome in the primary game. If there is no winning game outcome in step 945, or if an award has been provided in step 950, the gaming device determines if the gaming session is over based on the predetermined flat rate session's predetermined game plays or game duration in step 955. If the flat rate session is over, the collectible indicia recorded in the register are reviewed to determine if the collectible indicia form a winning secondary game award (e.g., a winning bonus game outcome) in step 960. If sufficient collectible indicia are recorded in the register, a secondary award (e.g., a bonus award) is provided in step 965. If the flat rate gaming session is not over, a new individual primary game is starting by randomly selecting indicia to form an intermediate game outcome in step 920. Game play continues as described above until the flat rate gaming session is terminated at step 970 when the predetermined duration of the gaming session is completed.

Collectible Indicia from Held Indicia in a Flat Rate Gaming Session

Figure 10A:
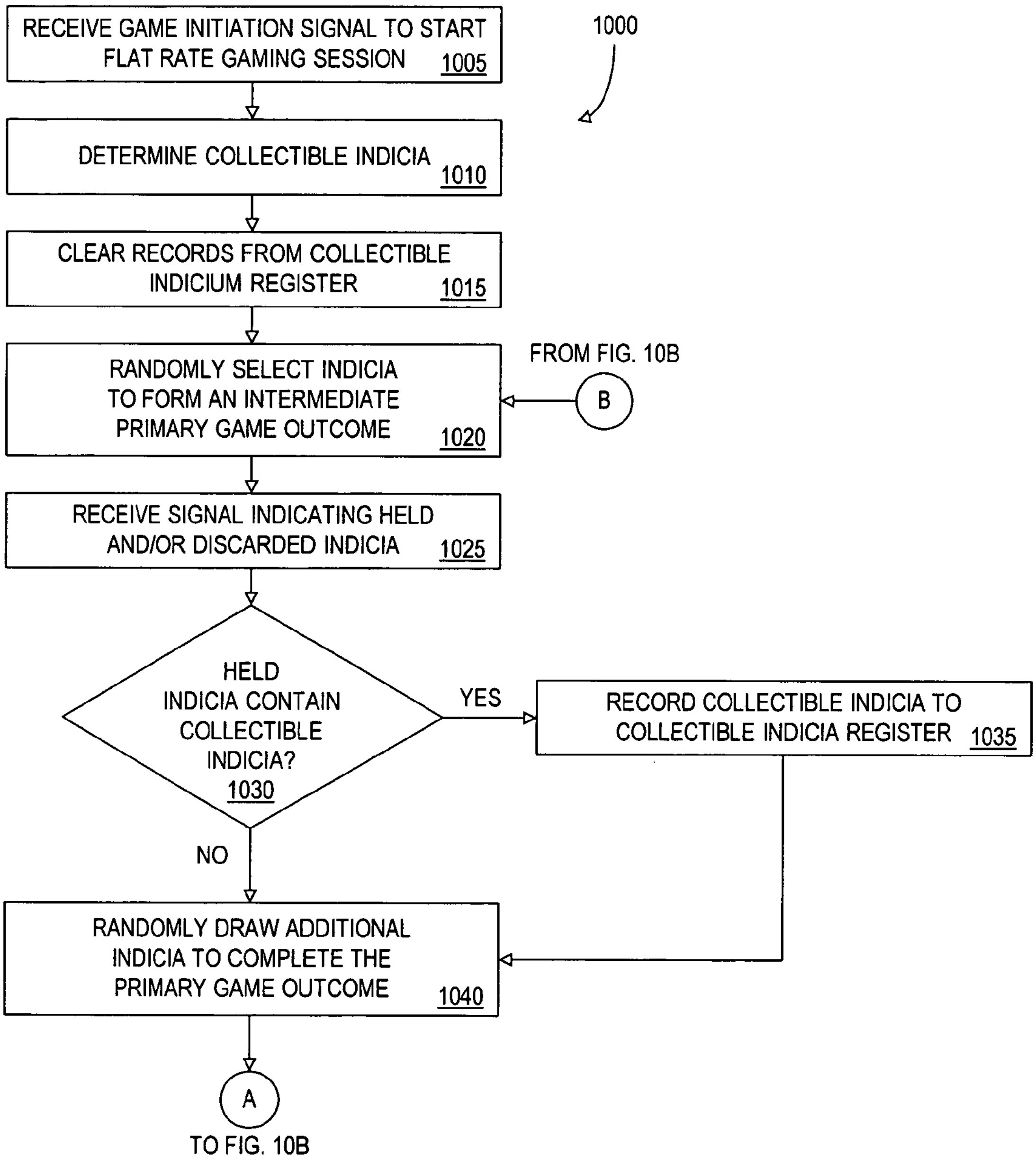
FIG. 10 is a flow chart illustrating, in one embodiment, the process of using a finite series of primary games to populate a secondary game with held indicia from the primary games.
Figure 10B:
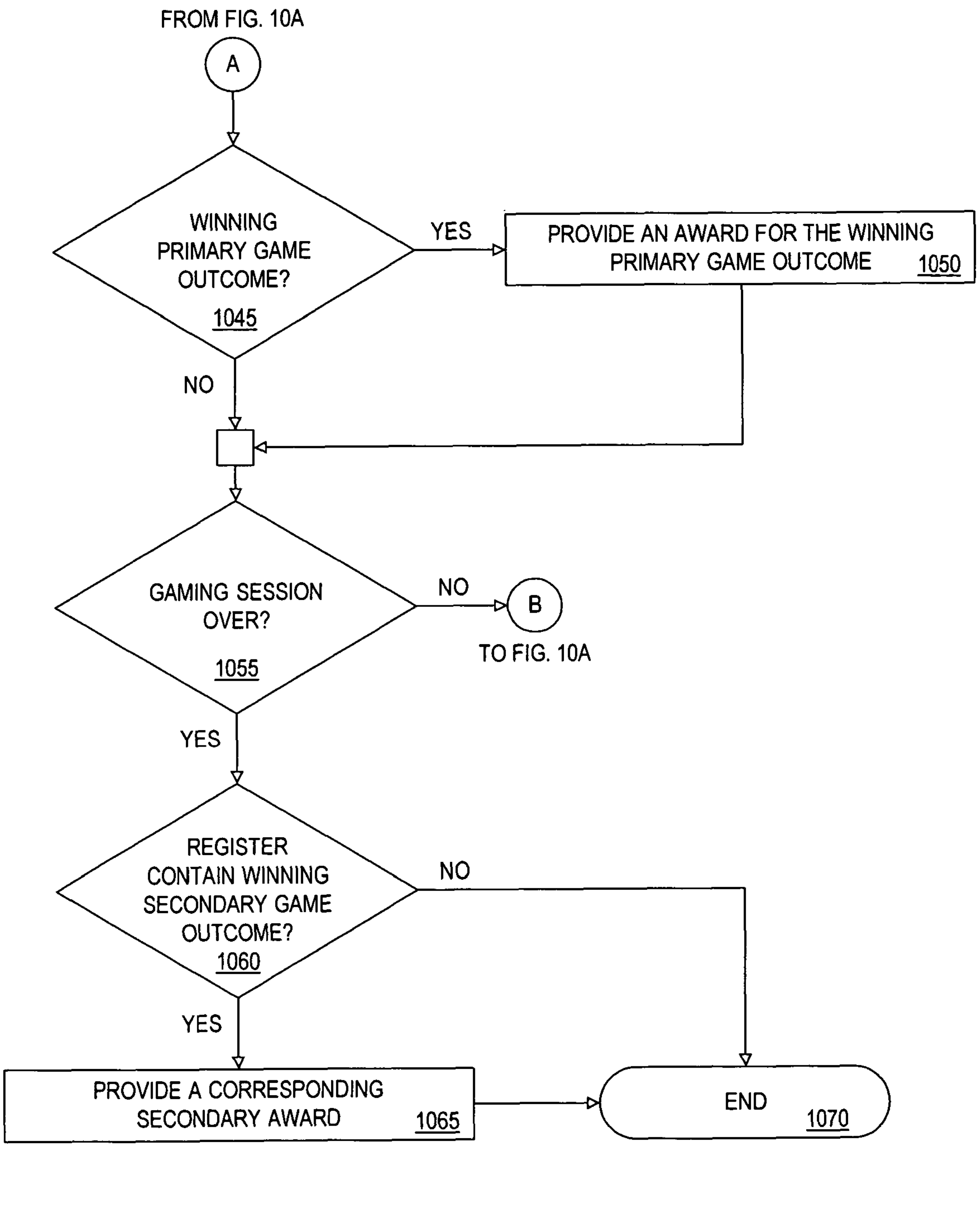

In another embodiment of a flat rate gaming session, discarded indicia are the only collectible indicia that may be recorded to the register for determining a secondary winning game outcome. FIG. 10 illustrates this process in a finite gaming session as an exemplary embodiment of this game play mechanic. The process of FIG. 10 may be applied, in some embodiments, to the gaming device 200 of FIG. 2 or of the gaming device 300 in FIG. 3 as follows.

The gaming device recognizes a wager to purchase a flat rate gaming session in step 1005. The flat rate gaming session either may have a predetermined number of game plays or predetermined time duration. The game program may have a predetermined designated collectible indicium, or in some embodiments, the player may designate a collectible indicium in step 1010. In step 1015, a register for recording each collectible indicium as it occurs is set to zero. If desired, in some embodiments, a multiple indicia may be designated as collectible. The gaming device then randomly selects indicia to form an intermediate game outcome in step 1020. The player may then designate indicia to be held (or discarded) from the intermediate game outcome in step 1025. Now, the gaming device determines whether any of the held indicia contain collectible indicia in step 1030. If collectible indicia are held in step 1030, these collectible indicia are recorded to the register of collectible indicia from each of the previous games in the flat rate gaming session in step 1035. After the register appropriately records any collectible indicia in step 1035, or if no held indicia contain collectible indicia, additional indicia are randomly drawn to complete the intermediate game outcome to form a game outcome in step 1040. If the game outcome is a winning game outcome as determined in step 1045, an award is provided in step 1050 for that winning game outcome in the primary game. If there is no winning game outcome in step 1045, or if an award has been provided in step 1050, the gaming device determines if the gaming session is over based on the predetermined flat rate session's predetermined game plays or game duration in step 1055. If the flat rate session is over, the collectible indicia recorded in the register are reviewed to determine if the collected collectible indicia form a winning secondary game award (e.g., winning bonus game outcome) in step 1060. If sufficient collectible indicia are recorded in the register, a secondary award (e.g., a bonus award) is provided in step 1065. If the flat rate gaming session is not over, a new individual primary game is started by randomly selecting indicia to form an intermediate game outcome in step 1020. Game play continues as described above until the flat rate gaming session is terminated at step 1070 when the predetermined duration of the gaming session is completed.

Collectible Indicia from Drawn Indicia in a Flat Rate Gaming Session

Figure 11A:
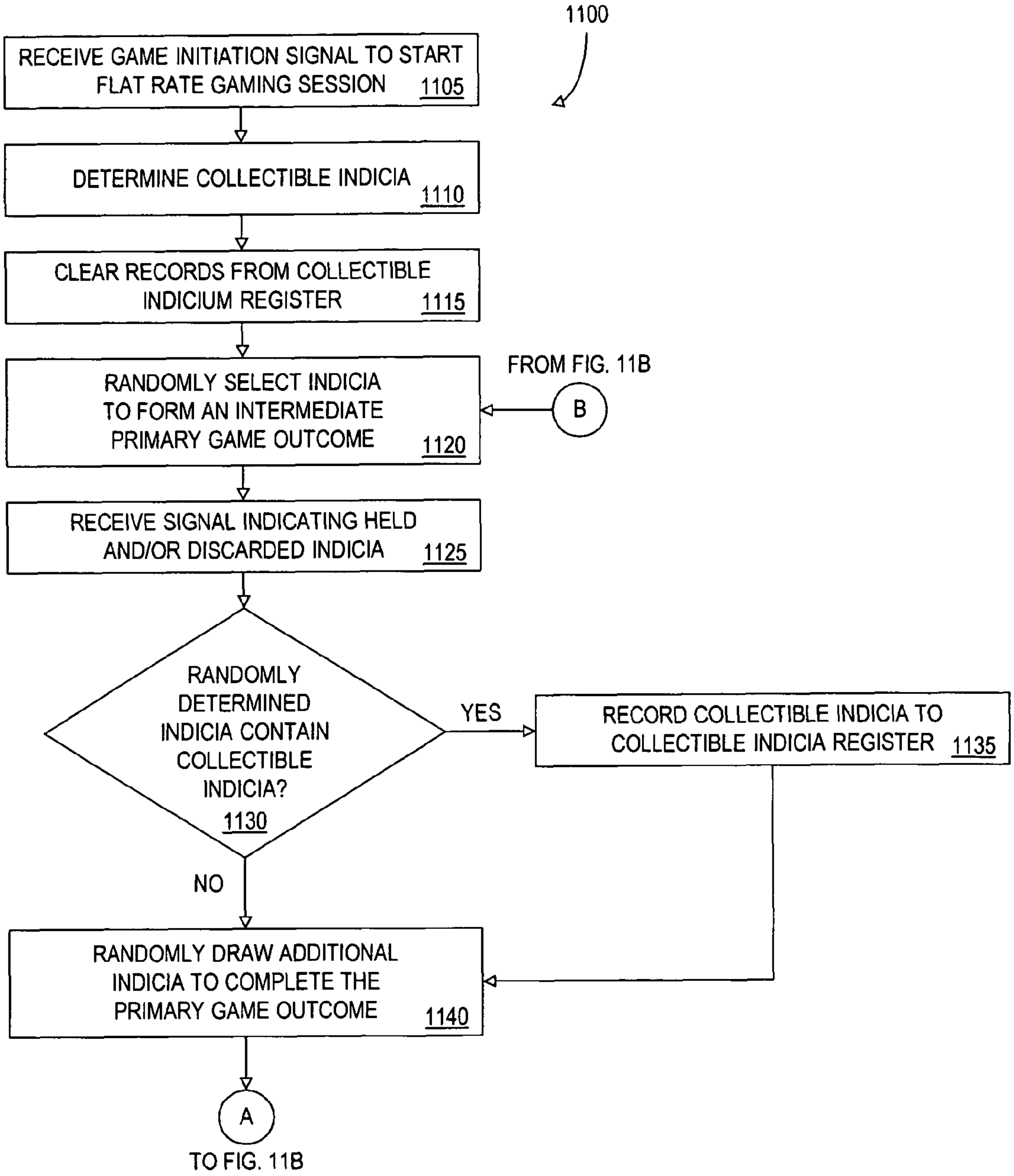
FIG. 11 is a flow chart illustrating, in one embodiment, the process of using a finite series of primary games to populate a secondary game with drawn indicia from the primary games.
Figure 11B:
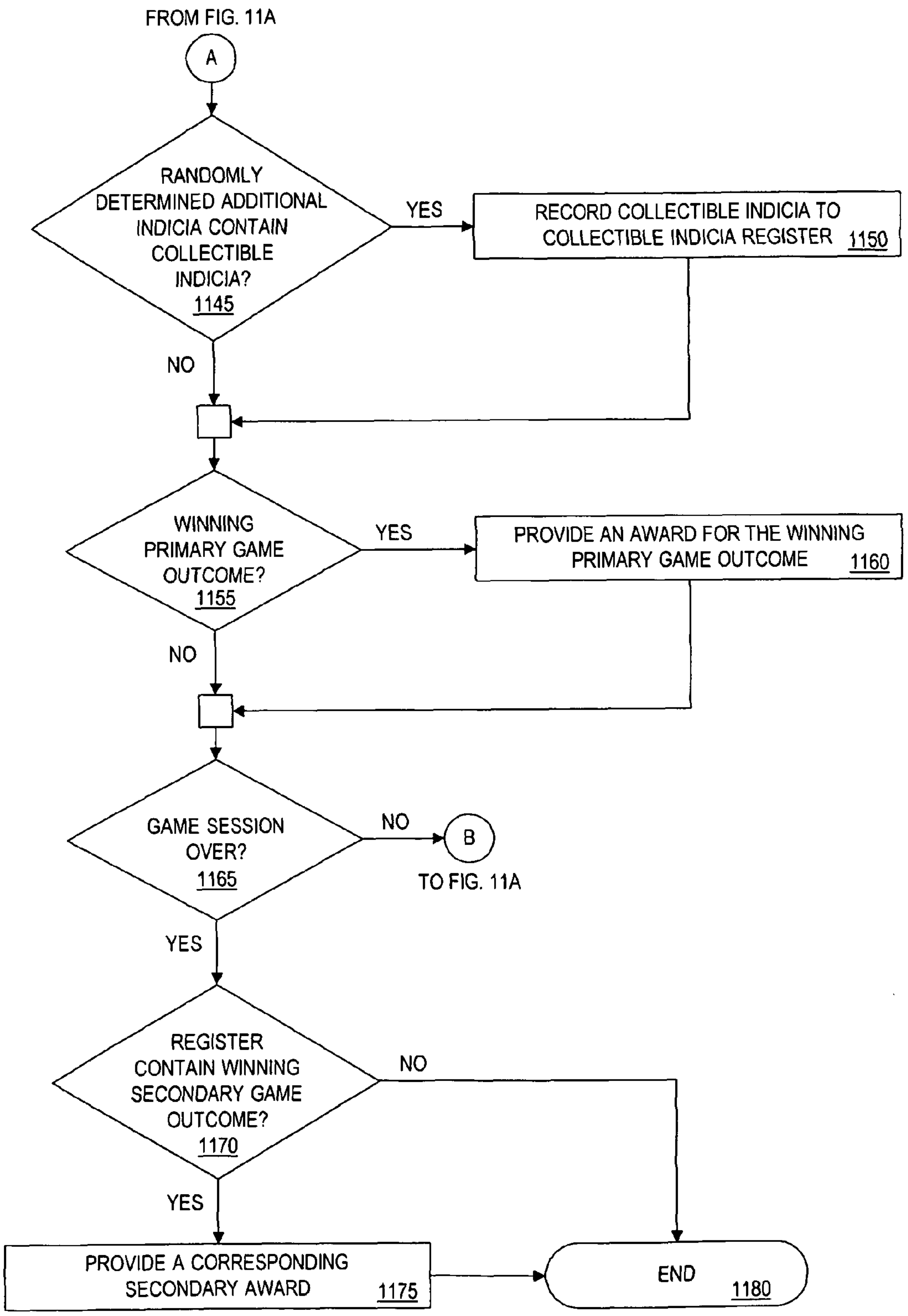

In another embodiment of a flat rate gaming session, collectible indicia may be collected from all drawn indicia used to form the intermediate game outcome. In another embodiment, the indicia drawn for both the intermediate game outcome and the replacement indicia to complete the final game outcome may be used as collectible indicia. These occurrences of collectible indicia are recorded to the register for determining a secondary winning game outcome. FIG. 11 illustrates this process in a finite gaming session as an exemplary embodiment of this game play mechanic. The process of FIG. 11 may be applied, in some embodiments, to the gaming device 200 of FIG. 2 or of the gaming device 300 in FIG. 3 as follows.

The gaming device recognizes a wager to purchase a flat rate gaming session in step 1105. The flat rate gaming session may have either a predetermined number of game plays or a predetermined time duration. The game program may have a predetermined designated collectible indicium, or in some embodiments, the player may designate a collectible indicium in step 1110. In step 1115, a register for recording each collectible indicium as it occurs is set to zero. If desired, in some embodiments, a multiple indicia may be designated as collectible. The gaming device then randomly selects indicia to form an intermediate game outcome in step 1120. The player may then designate indicia to be held from the intermediate game outcome in step 1125. The gaming device next determines whether any of the indicia drawn into the intermediate game outcome contain collectible indicia in step 1130. If collectible indicia are held in step 1130, these collectible indicia are recorded to the register of collectible indicia from each of the previous games in the flat rate gaming session in step 1135. After the register is incremented appropriately in step 1135, or if no held indicia contain collectible indicia, additional indicia are randomly drawn to complete the intermediate game outcome to form a final game outcome in step 1140. The gaming device next determines whether any of the indicia drawn into the intermediate game outcome contain collectible indicia in step 1145. If collectible indicia are drawn in step 1140, these collectible indicia are recorded to the register of collectible indicia in step 1150. The gaming device then determines if the primary game outcome is a winning game outcome as determined in step 1155, an award is provided in step 1160 for a winning game outcome in the primary game. If there is no winning game outcome in the primary game or if an award has been provided in step 1160, the gaming device determines if the gaming session is over based on the flat rate session's predetermined game plays or game duration in step 1165. If the flat rate session is over, the collectible indicia recorded in the register are reviewed to determine if the collectible indicia form a winning secondary game award (e.g., a winning bonus game outcome) in step 1170. If sufficient collectible indicia are recorded in the register, a secondary award (e.g., a bonus award) is provided in step 1175. If the flat rate gaming session is not over, a new individual primary game is starting by randomly selecting indicia to form an intermediate game outcome in step 1120. Game play continues as described above until the flat rate gaming session is terminated at step 1180 when the predetermined duration of the gaming session is completed.

As discussed above, it should be understood that the game play could be modified to designate, in some embodiments, that the drawn indicia to complete the final game outcome can also be collectible indicia.

Expiration of Collectible Indicia in an Indeterminate Series of Primary Games

In some embodiments, collected cards may have a limited effective duration during a session before they "expire" or are otherwise removed from an indicia collection area and/or decremented from a collection total (e.g., each discarded Ace is sent to a collection area, where it remains for only six hands after it has been discarded, at which time it "expires" and is removed from the collection area).

The expiration of collectible indicia is a particularly important concept in one embodiment in which an undefined number, or series, of primary games may be played before a player cashes out of the gaming device. In such embodiments, the player could potentially play for such extended periods of time that a winning secondary game outcome would be assured. Although this is one potential embodiment, other embodiments can increase the excitement of game play—as well as making the secondary pay table more rewarding—by allowing collectible indicia to expire after a predetermined duration.

In such a game with expiring collectible indicia, a player may be awarded a relatively substantial payout for achieving a goal of collecting a specified number of indicia, for several reasons. First, because collected indicia expire after a specified duration (e.g., this duration may be fixed or variable, it may become challenging to amass sufficient indicia to earn a payout, as collected indicia will frequently be expiring.

Secondly, a gaming device may fund a lucrative bonus payout and still maintain a desired house edge and primary game payout structure, because players choose whether to pursue the primary game or the secondary game in order to obtain a winning game outcome—potentially sacrificing one game for the other. In other words, the existence of the bonus feature may serve to substitute for payouts from the primary game, as players may discard indicia that otherwise may have been held to produce winning outcomes.

Methods of tracking collected game symbols (such as playing cards) and associating expiration conditions therewith are described in commonly-owned U.S. patent application Ser. No. 10/772,837, filed Feb. 10, 2004, entitled "ELECTRONIC AMUSEMENT DEVICE AND METHOD FOR ENHANCED SLOT MACHINE PLAY"; and commonly-owned U.S. Pat. No. 6,203,430, filed Oct. 1, 1998, entitled "ELECTRONIC AMUSEMENT DEVICE AND METHOD FOR ENHANCED SLOT MACHINE PLAY"; the entirety of each are incorporated herein by reference for all purposes.

Figure 12A:
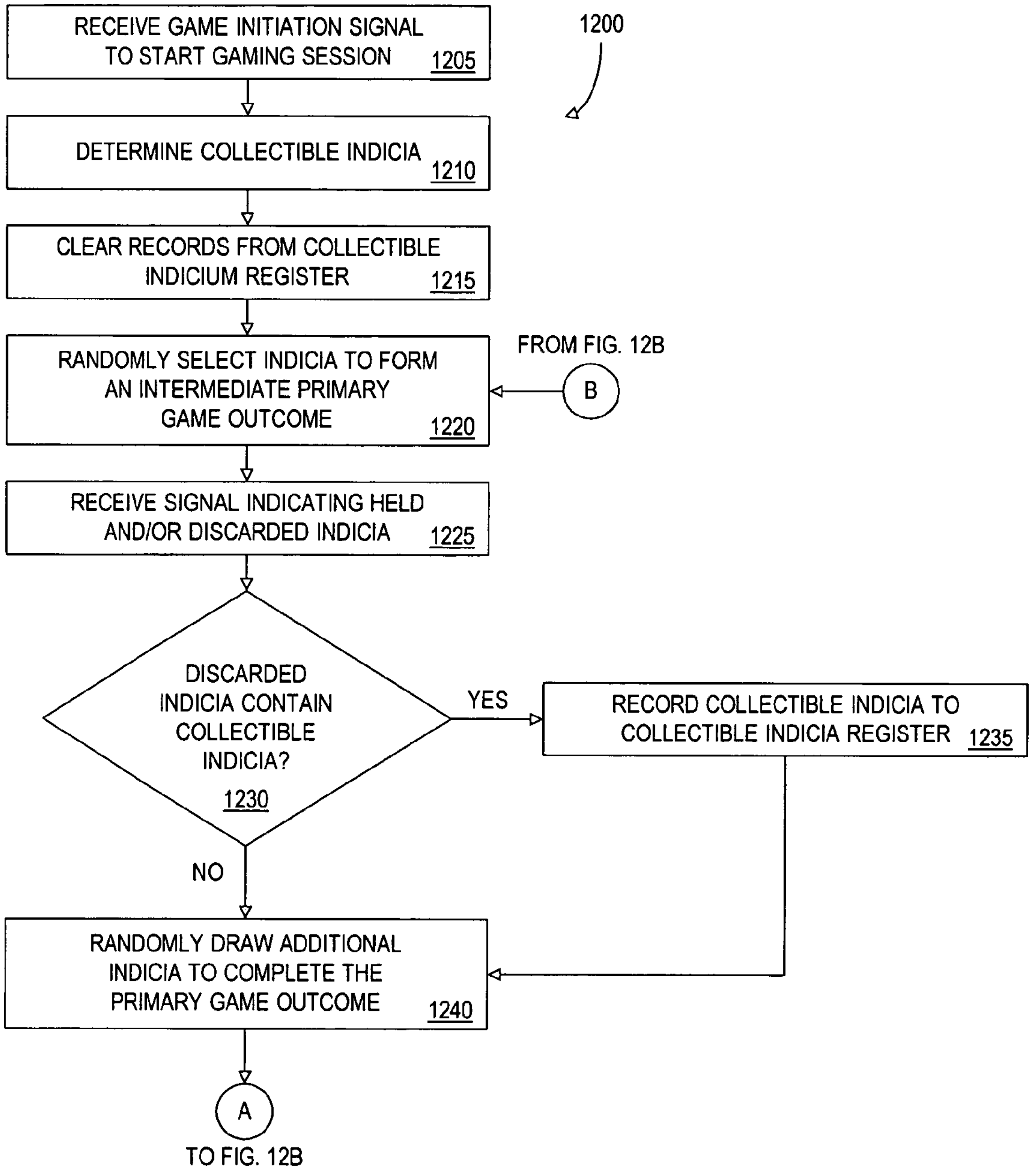
FIG. 12 is a flow chart illustrating, in one embodiment, the process of using an indefinite series of primary games to populate a secondary game with discarded indicia from the primary individual games.
Figure 12B:
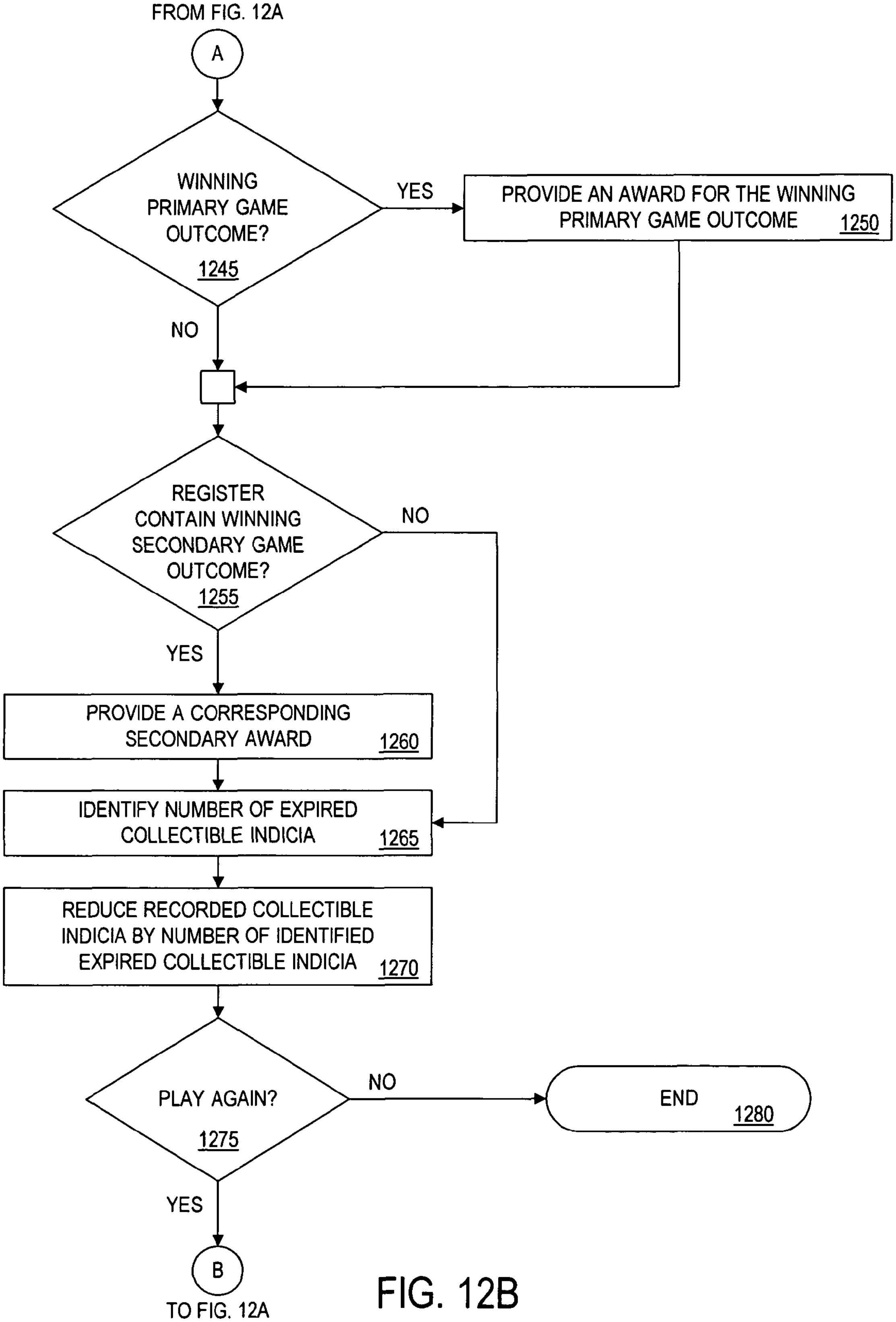

Collectible Indicia from Discarded Indicia in an Indeterminate Series of Primary Games In another embodiment, only collectible indicia in discarded indicia are considered collectable and may be recorded to the register for determining a secondary winning game outcome—until the collected indicia expire. FIG. 12 illustrates this process in an ongoing (i.e., no limitation on the number of primary games the player may play to win the secondary game) gaming session as an exemplary embodiment of this game play mechanic. The process of FIG. 12 may be applied, in some embodiments, to the gaming device 200 of FIG. 2 or of the gaming device 300 in FIG. 3 as follows.

The gaming device recognizes a wager to purchase an individual primary game in step 1205. In step 1210, collectible indicia are determined. The game program may have a predetermined designated collectible indicium, or in some embodiments, the player may designate a collectible indicium. If desired, in some embodiments, a multiple indicia may be designated as collectible. In step 1215, a register for recording each collectible indicium as it occurs is set to zero. The gaming device then randomly selects indicia to form an intermediate game outcome in step 1220. The player may then designate indicia to be held from the intermediate game outcome in step 1225. Now, the gaming device determines whether any of the discarded indicia contain collectible indicia in step 1230. If collectible indicia are held in step 1230, these collectible indicia are recorded to the register of collectible indicia in step 1235. After the register is incremented appropriately in step 1235, or if no held indicia contain collectible indicia, additional indicia are randomly drawn to complete the intermediate game outcome to form a game outcome in step 1240. If the game outcome is a winning game outcome as determined in step 1245, an award is provided in step 1250 for that winning game outcome. If there is no winning primary game outcome in step 1245, or if an award has been provided in step 1250, the gaming device then determines if there is a winning secondary game outcome (e.g., a winning bonus game) in step 1255. If a winning secondary game outcome is obtained as determined in step 1255, a secondary award (e.g., a bonus award) for the winning game outcome is provided in step 1260. If there are any expired collectible indicia identified in step 1265, the expired collectible indicia in the register are deleted in step 1270. The player then has the option in step 1275 to either continue game play at step 1220 (and possibly benefit from any collectible indicia that may still be active in the register to potentially create further winning secondary game outcomes) or end the game at step 1280.

Figure 13A:
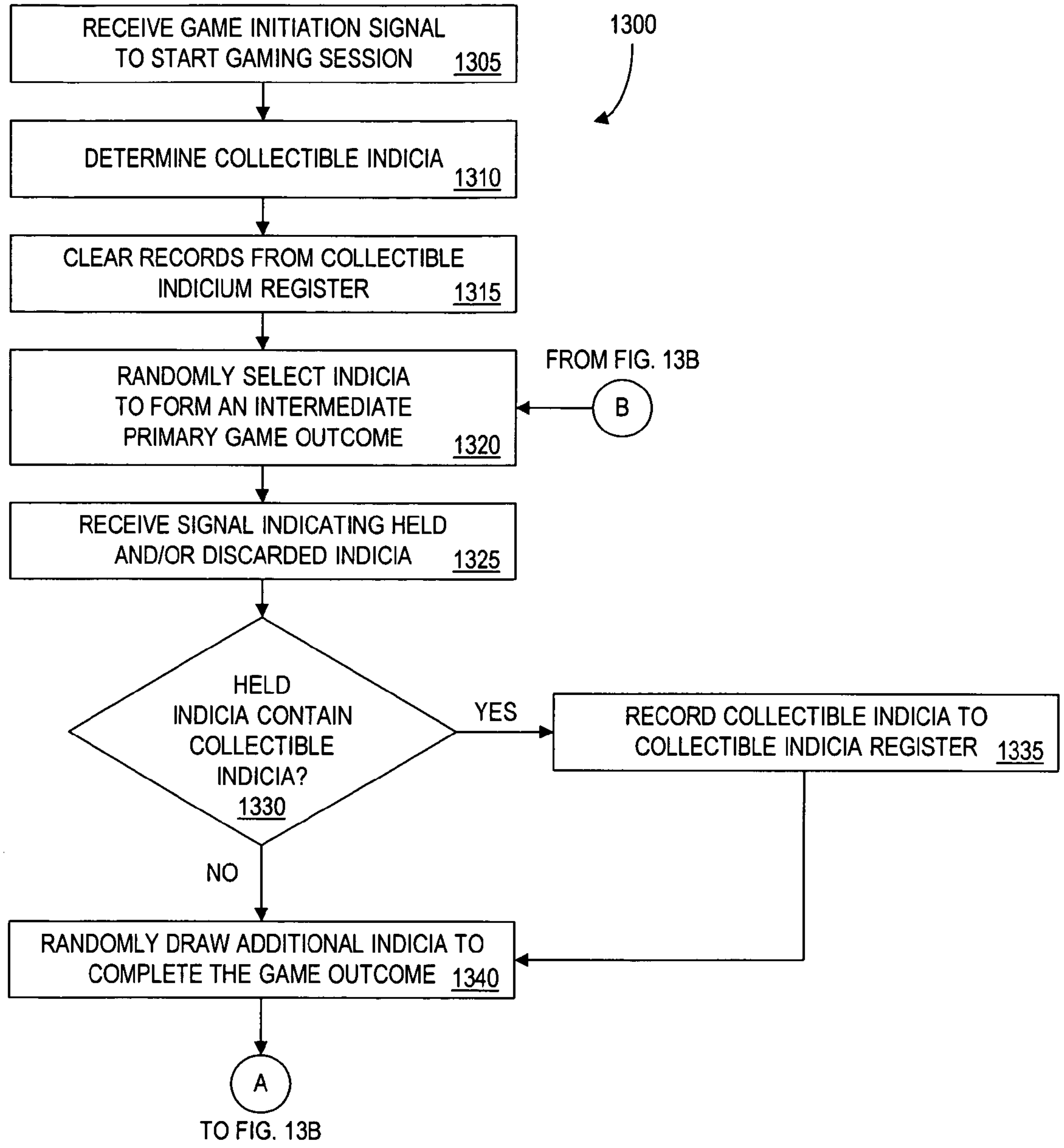
FIG. 13 is a flow chart illustrating, in one embodiment, the process of using an indefinite series of primary individual games to populate a secondary game with held indicia from the primary individual games.
Figure 13B:
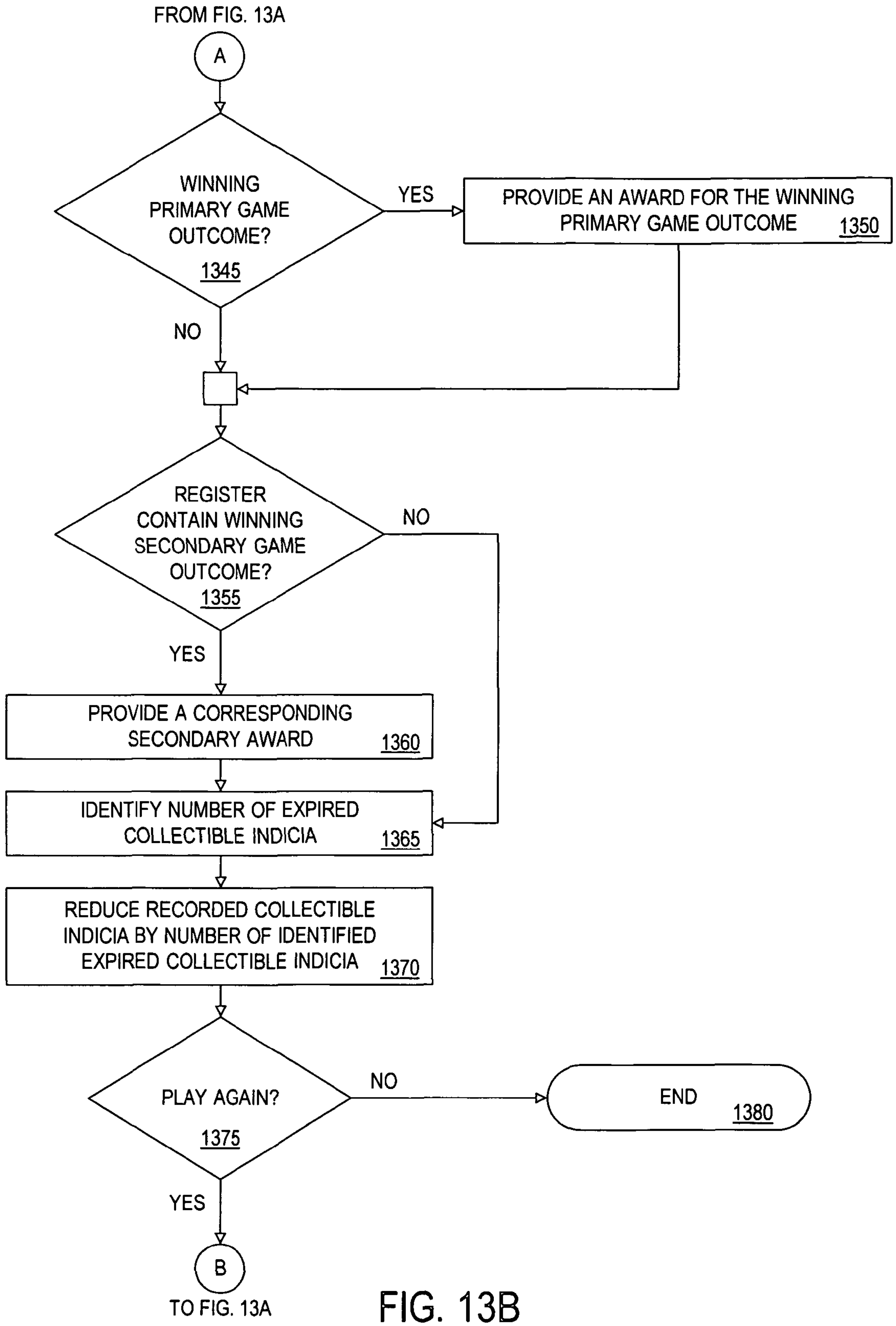

Collectible Indicia from Held Indicia in an Indeterminate Series of Primary Games In another embodiment, collectible indicia may be collected only from held indicia in the individual primary game, and may be recorded to the register for determining a secondary winning game outcome until expiring. FIG. 13 illustrates this process in an ongoing gaming session (i.e., no limitation on the number of primary games the player may play to win the secondary game) as an exemplary embodiment of this game play mechanic. The process of FIG. 13 may be applied, in some embodiments, to the gaming device 200 of FIG. 2 or of the gaming device 300 in FIG. 3 as follows.

The gaming device recognizes a wager to purchase an individual primary game in step 1305. In step 1310, collectible indicia are determined. The game program may have a predetermined designated collectible indicium, or in some embodiments, the player may designate a collectible indicium. If desired, in some embodiments, a multiple indicia may be designated as collectible. In step 1315, a register for recording each collectible indicium as it occurs is set to zero. The gaming device then randomly selects indicia to form an intermediate game outcome in step 1320. The player may then designate indicia to be held from the intermediate game outcome in step 1325. Now, the gaming device determines whether any of the discarded indicia contain collectible indicia in step 1330. If collectible indicia are held in step 1330, these collectible indicia are recorded to the register of collectible indicia in step 1335. After the register is incremented appropriately in step 1335, or if no held indicia contain collectible indicia, additional indicia are randomly drawn to complete the intermediate game outcome to form a game outcome in step 1340. If the game outcome is a winning game outcome as determined in step 1345, an award is provided in step 1350 for that winning game outcome. If there is no winning game outcome in step 1345, or if an award has been provided in step 1350, the gaming device then determines if there is a winning secondary game outcome (e.g., a winning bonus game outcome) in step 1355. If a winning secondary game outcome is obtained as determined in step 1355, a secondary award (e.g., a bonus award) for the winning game outcome is provided in step 1360. If there are any expired collectible indicia identified in step 1365, the expired collectible indicia in the register are deleted in step 1370. The player then has the option in step 1375 to either continue game play at step 1320 (and possibly benefit from any collectible indicia that may still be active in the register to potentially create further winning secondary game outcomes) or end the game at step 1380.

Figure 14A:
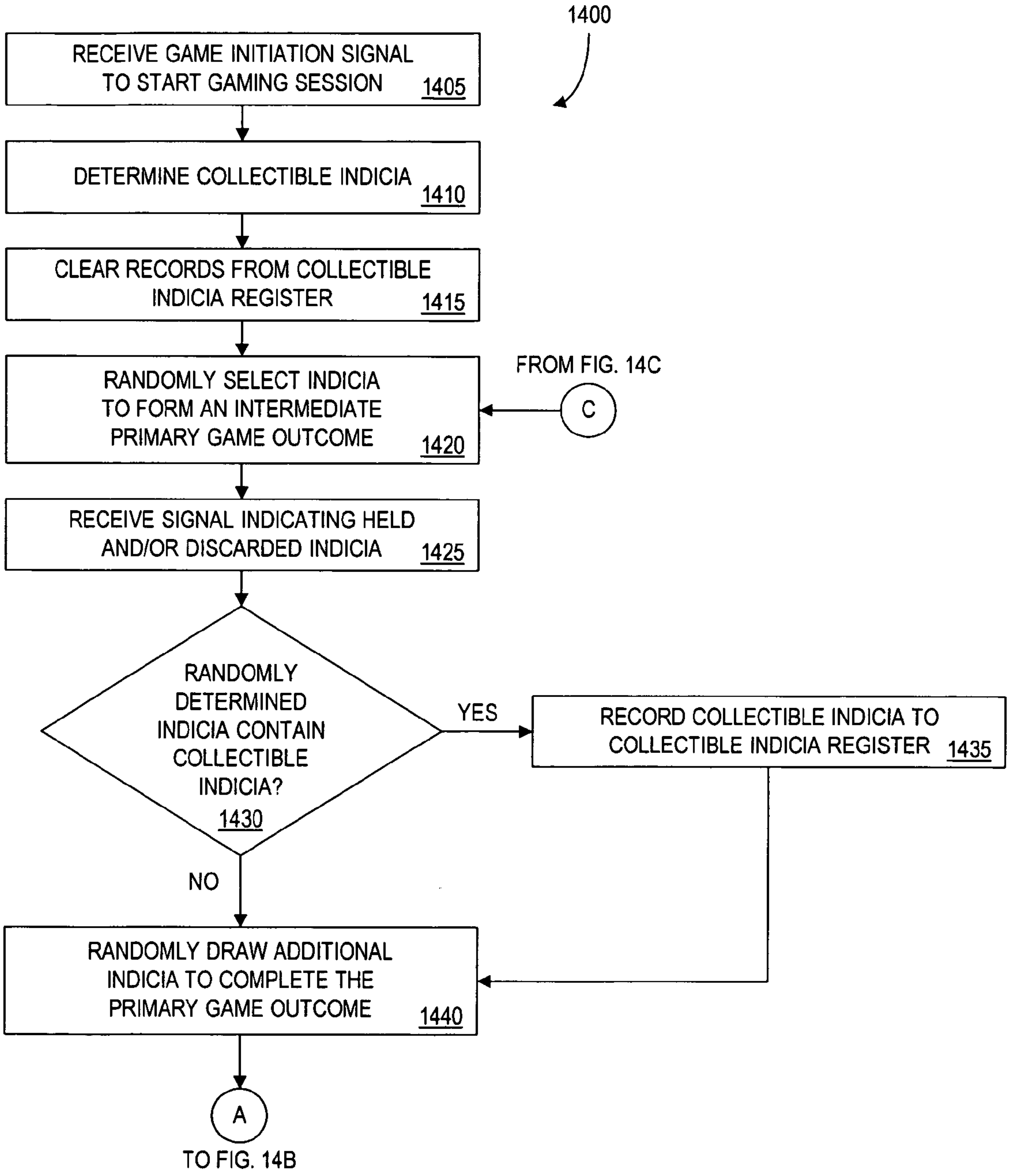
FIG. 14 is a flow chart illustrating, in one embodiment, the process of using an indefinite series of primary individual games to populate a secondary game with drawn indicia from the primary individual games.
Figure 14B:
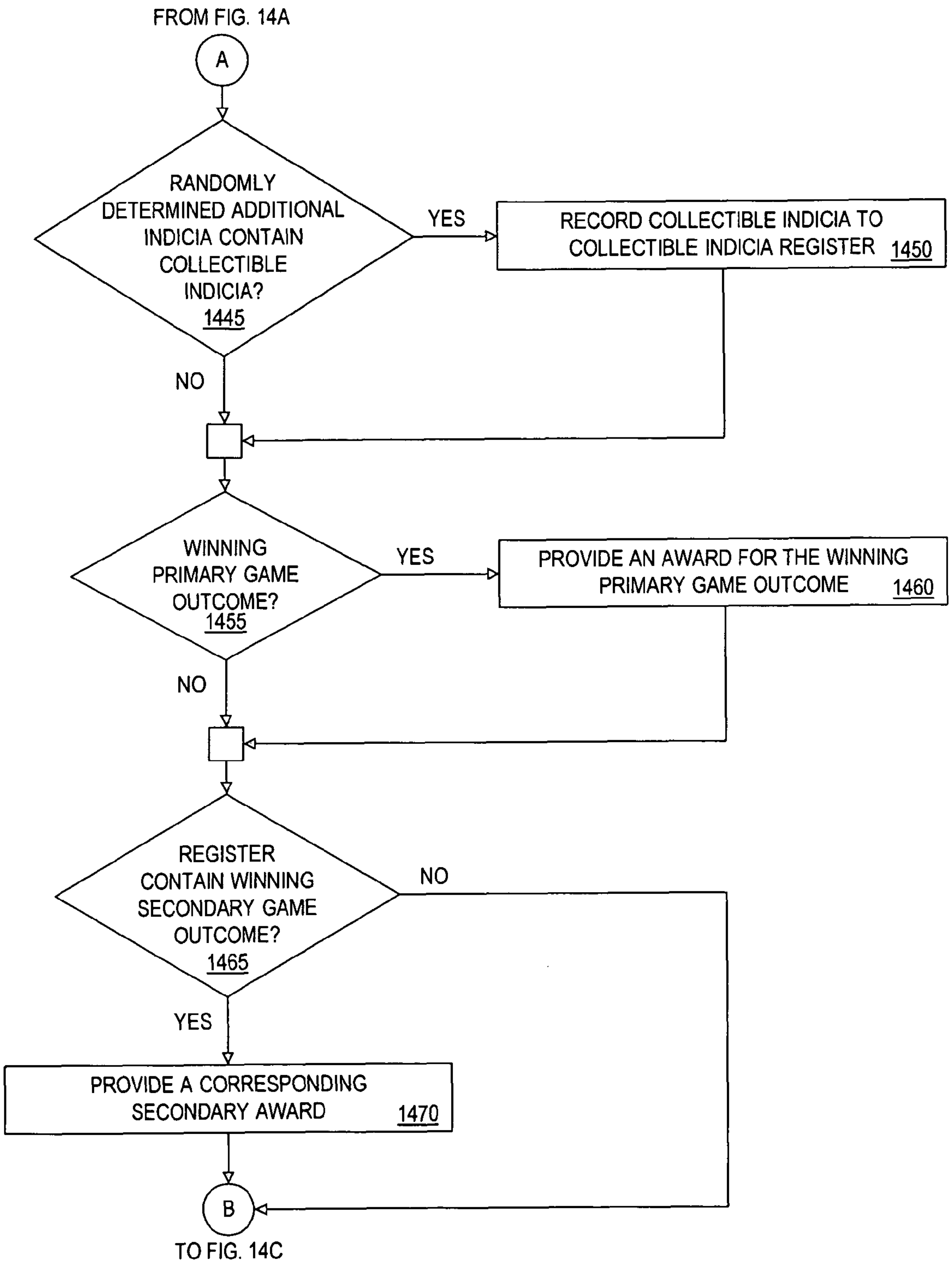
Figure 14C:
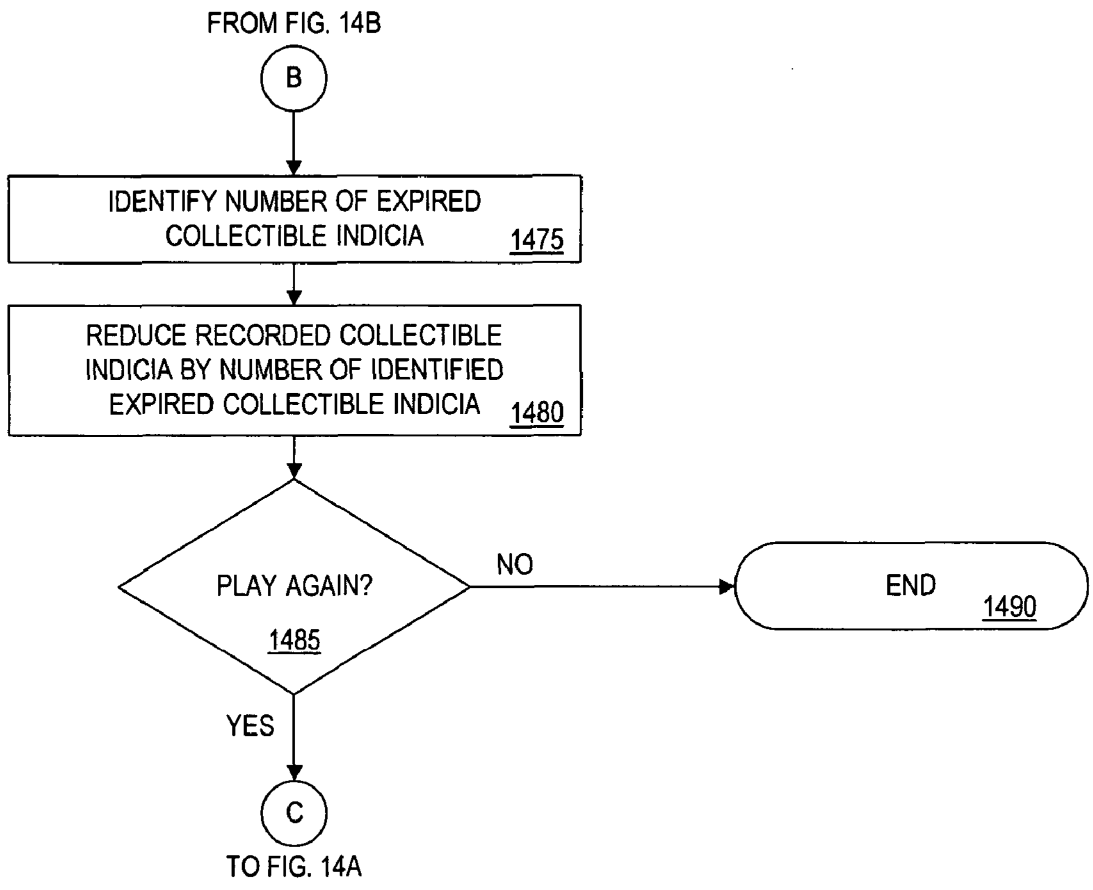

Collectible Indicia from Drawn Indicia in an Indeterminate Series of Primary Games In another embodiment, collectible indicia may be recorded to the register from any drawn indicia for determining a secondary winning game outcome until expiring. FIG. 14 illustrates this process in an ongoing gaming session (i.e., no limitation on the number of primary games the player may play to win the secondary game) as an exemplary embodiment of this game play mechanic. The process of FIG. 14 may be applied, in some embodiments, to the gaming device 200 of FIG. 2 or of the gaming device 300 in FIG. 3 as follows.

The gaming device recognizes a wager to purchase an individual primary game in step 1405. In step 1410, collectible indicia are determined. The game program may have a predetermined designated collectible indicium, or in some embodiments, the player may designate a collectible indicium in step 1410. If desired, in some embodiments, a multiple indicia may be designated as collectible. In step 1415, a register for recording each collectible indicium as it occurs is set to zero. The gaming device then randomly selects indicia to form an intermediate game outcome in step 1420. The player may then designate indicia to be held from the intermediate game outcome in step 1425. Now, the gaming device determines whether any of the drawn indicia in the intermediate game outcome contain collectible indicia in step 1430. If collectible indicia are held in step 1430, these collectible indicia are recorded to the register of collectible indicia in step 1435. After the register is incremented appropriately in step 1435, or if no held indicia contain collectible indicia, additional indicia are randomly drawn to complete the intermediate game outcome to form a final game outcome in step 1440. If any of the randomly drawn replacement indicia to complete the final game outcome contain any additional collectible indicia in step 1445, these collectible indicia are recorded to the collectible indicia register in step 1450. After the register is incremented appropriately in step 1450, or if no held indicia contain collectible indicia, the primary game is examined for a winning game outcome in step 1455. If there is a winning primary game outcome, an award is provided in step 1460. If there is no winning primary game outcome in step 1455 of if the award is paid for a winning primary game outcome in step 1460, the collectible indicia register is evaluated for a winning secondary game outcome (e.g., a winning bonus game outcome) in step 1465. If there is a winning secondary game outcome, the player is provided a secondary award (e.g., a bonus award) corresponding to the collectible indicia in the register in step 1470. If there is no winning secondary game outcome in step 1465, or if a secondary award has been provided in step 1470, the gaming device then determines if there are any expired collectible indicia in step 1475, and if so, eliminates expired collectible indicia from the register in step 1480. The player then has the option in step 1485 to either continue game play at step 1420 (and possibly benefit from the collectible indicium in the register to potentially create further winning secondary game outcomes) or end the game at step 1490.

Position Determined Collectible Indicia

As discussed above, collectible indicia may be limited to those subsets of intermediate game outcomes and/or game outcomes limited to held, discarded, or may be all drawn indicia. In further embodiments, only cards dealt or drawn to a certain position or in a certain order may be considered collectible (e.g., in order to be collected, a particular card must be dealt or drawn to the fourth of five card positions). For example, collectible indicia may be limited to the position that an indicium occupies on the video display. For example, only indicia occurring in a designated card position may be considered collectible.

Figure 15:
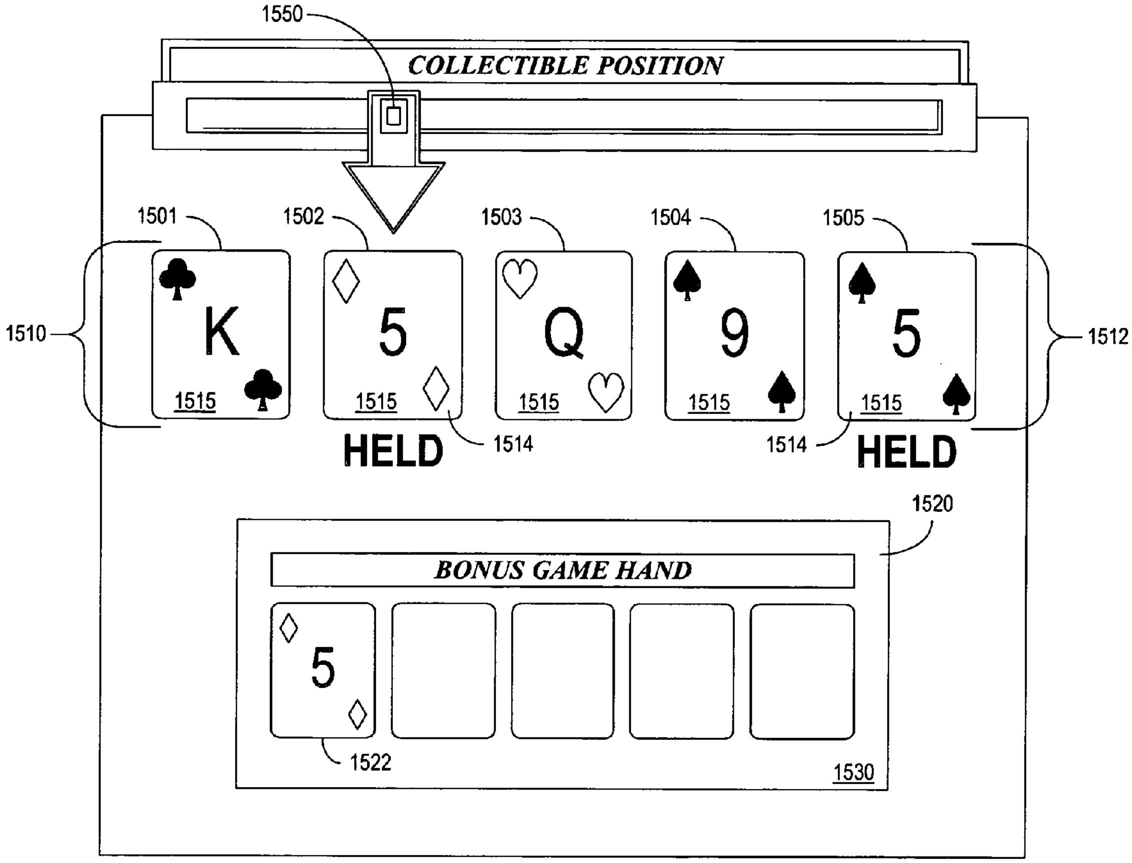
FIG. 15 is an example of one embodiment of an intermediate primary game outcome with a randomly selected collectible indicium.

In an alternate embodiment, only indicia in a position randomly designated by the gaming device may be considered collectible. For example, as shown in FIG. 15, an indicator (e.g., mechanical or electronic) 1550 may be used to designate one of the five indicia positions (e.g., 1501, 1502, 1503, 1504, and 1505) from which collectible indicia 1522 may be collected. The indicator 1550 may randomly determine the selected position of a collectible indicium 1522.

For example, in FIG. 15, an embodiment is shown that collects indicia occupying the selected position determined by the indicator 1550. Consequently, the register has recorded the five of Diamonds as shown in the secondary game display area 1530 of FIG. 15. This selection may occur before or after cards are indicated as held or discarded. The primary game 1510 has two held cards 1514 from the drawn cards 1515. The intermediate primary game outcome is depicted as 1512. In this embodiment, indicia are collected in the secondary game 1520 until a winning game outcome may be formed as long as primary games 1510 are played. The object of this embodiment in the secondary games 1520 is to collect collectible indicia 1522 in the collection area 1530 that will produce a winning poker hand.

Figure 16:
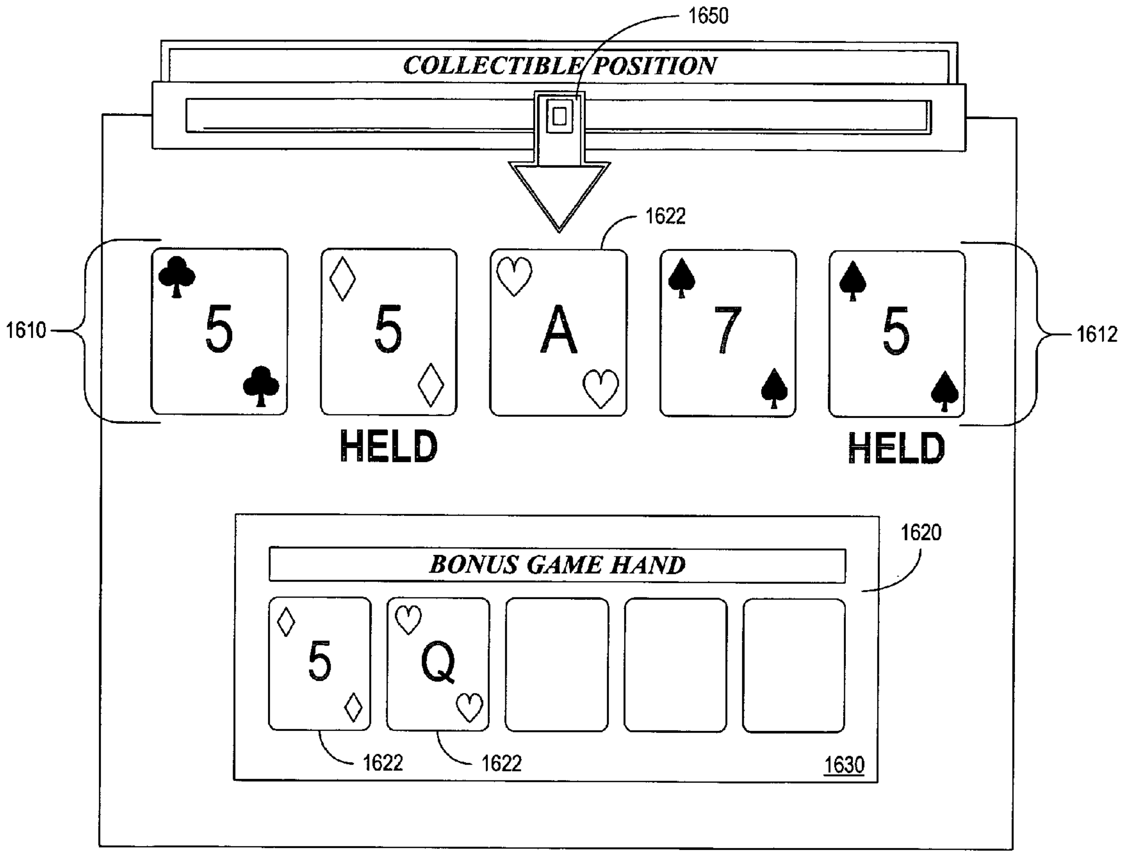
FIG. 16 is a continuation of the game play of the example embodiment of FIG. 15.

Turning to FIG. 16, a second individual primary game 1612 is depicted with a new random position located by the indicator 1650 that collects the Ace of Hearts into the collection area 1630 of the secondary game 1620. The player now has an intermediate secondary game outcome that includes the five of Diamonds and the Queen of Hearts. Additional individual primary games may be played to collect sufficient additional indicia to form a secondary game outcome.

If a winning poker hand is not formed in the secondary game, the secondary collection area 1530 may be emptied. Alternatively, the collectible indicia may have a finite life and expire as primary game play continues. For example, the number of selected indicia may be limited by the number of indicia positions, with each subsequent collected indicium removing the oldest or randomly selected indicia from the register.

Auto-Play

In one or more embodiments, a gaming device may be configured to analyze and/or store player decisions with respect to holding and discarding cards. For example, if on one or more instances a player is dealt a single Ace along with a number of other suited cards (e.g., the player is dealt Ah-7h-Jh-5c-10d), such that the player has "three cards to a flush", and the player chooses to hold the suited cards (rather than discard the Ace), a gaming device may be configured to store an indication of the player's choice given the particular hand (or type of hand). A historic decisions database, shown in FIG. 17, in communication with the gaming device may be used to store such historic hold/discard decisions in association with a player.

For example, a decisions database 1700 may indicate possible combinations of cards that a player may initially be dealt (e.g., Ah-7h-Jh-5c-10d is one combination). The database may also indicate possible "hold choices" along with each initial hand dealt to a player (e.g., in association with Ah-7h-Jh-5c-10d, the player may choose to hold Ah-7h-Jh, etc.). Further, such a database may indicate a number of instances which a player elected to pursue a particular strategy (e.g., when dealt Ah-7h-Jh-5c-2d, the player held Ah-7h-Jh 12 times and Ah three times, as indicated by an "actual held cards" field 1710 of such a database). An exemplary data structure of such a database follows.

It should of course be understood that rather than various "initial/dealt hands" may be considered substantially similar in their nature, such that it may be assumed that if a player made a strategic hold/discard decision in association with a first hand (e.g., Ah-7h-Jh-5c-4d), the same decision may apply to a second hand (e.g., Ah-7h-Jh-5c-3d). In some embodiments, a database may store indications of such "like hands".

In this manner, historic play decisions may be stored in association with a particular player. In some embodiments, automated play may then be based on such historic play decisions. For example, if a player executes a "cruise control" feature as described, a gaming device may be configured to (i) deal an initial hand, (ii) determine whether or not historic play decision data exists in association with the hand (or one or more similar hands), and if so (iii) execute hold/discard decisions automatically based on the data. In some embodiments, if no data exists in association with the hand (or one or more similar hands), the gaming device may execute hold/discard decisions automatically based on stored default "perfect strategy" rules.

In further embodiments, a variety of other parameters may be measured and/or stored when a play decision is stored, including but not limited to (i) a number of collected cards, (ii) an expiration value associated with one or more collected cards, (iii) a current credit balance, (iv) an interval remaining in association with a session, and so on. For example, when a player is dealt an initial hand of Ah-As-Ad-5c-4d, and the player has collected eight out of twelve Aces necessary to receive a substantial secondary payout, the player may discard the three dealt Aces. However, if the player is dealt an initial hand of Ah-As-Ad-5c-4d (or a comparable hand) and the player has only seven Aces collected, the player may decide to hold the Aces. Additionally, a player may be more or less likely to discard such Aces depending on an expiration value associated with one or more cards already collected by the player (e.g., if three of the player's Aces expire on the next hand, and the player isn't "close" to getting a secondary payout, the player may choose not to discard the cards). In another example, if the player has a sufficiently negative credit balance, and little time remaining in a session, the player may be more likely to make an aggressive play for a larger payout amount (e.g., discarding three Aces). Thus, in some embodiments, historic play decision data may consider the hold/discard decisions a player has made with respect to certain game conditions, including (i) an initial hand dealt to a player, (ii) a number of collected cards, (iii) an expiration value associated with one or more collected cards, (iv) a current credit balance, (v) an interval remaining in association with a session, and so on.

Additionally, a gaming device may be configured to detect a player's tendency to play toward payouts from the primary game (e.g., the player usually holds Aces) or payouts from the bonus feature (e.g., the player frequently discards Aces, even when dealt three or more). In one embodiment, in response to detecting that a player seems to be disregarding the bonus feature, a gaming device may be configured to output a message to the player promoting the bonus feature. Along with the promotional message, an additional benefit may be offered to entice the player to interact with the bonus feature by discarding cards (e.g., "Discard this Ace and get two instead of one", "Discard these Aces and they'll last for eight hands instead of six", etc.).

A gaming device may measure whether or not a player is utilizing such a bonus feature in a variety of manners. In one example, a gaming device and/or server may monitor a "discard percentage" in association with a player, which may be determined by the following example: Aces Discarded Percentage=Total Aces Discarded/Total Aces Dealt In some embodiments, it may then be determined to output a message based on the discard percentage (e.g., if the discard percentage is less than 40%, output a message). In some embodiments, the determination of whether or not to output a message may also be based on the number of total Aces dealt. For example, if the player has been dealt more than 20 Aces, and this discard percentage is less than 50%, then a message may be output to a player.

As stated, a discard percentage may be associated with a player. Players may be identified in a variety of manners. In one example, it may be assumed that a single player is associated with each flat-rate play session (e.g., a discard percentage is associated with each session, and thereby with an individual player). In non-session embodiments, a player might be identified by player tracking means as known in the art, or, for example, by detecting a sustained break between consistent game plays (e.g., such that it can be assumed a new player has engaged with a gaming device if the device had been idle for a period of time).

CONCLUSION

Although the foregoing described only a few of the most popular wagering games (in particular video poker) to which the secondary game may be applied, it should be appreciated that any type of wagering game (e.g., Black Jack, Baccarat, or any other card game) could also be used as the primary game from which indicia may be collected. Further, the game is not limited to the embodiments of the gaming devices described (i.e., video gaming devices, such as video slot machines and video poker machines), but can also be applied to other types of gaming devices, such as electro-mechanical gaming machines with mechanical reels for displaying game outcomes.

Thus, while the present invention has been described in terms of certain embodiments, other embodiments that are apparent to those of skill in the art are also intended to be within the scope of the present invention. Accordingly, the scope of the present invention is intended to be limited only by the claims appended hereto.

We claim:

1. A method of playing a wagering game, comprising the performance of each of the following steps via a processor of a device operable to facilitate a wagering game:

recognizing a wager;

forming a plurality of primary games, wherein forming each primary game of the plurality of primary games comprises:

receiving a first set of indicia;

discarding a subset of the first set of indicia to create a held set of indicia;

receiving a randomly selected replacement set of indicia; and forming a primary game outcome comprising the replacement set of indicia and the held set of indicia;

counting each occurrence of a predetermined indicium in the plurality of primary games to determine a secondary game outcome;

providing a first award for a winning primary game outcome;

providing a second award for a winning secondary game outcome if a total count of each occurrence of the predetermined indicium satisfies a predetermined threshold;

determining a number of occurrences of the predetermined indicium over a course of the plurality of primary games;

determining a number of times the predetermined indicium has been discarded over the course of the plurality of primary games; and outputting a message encouraging the discarding of the predetermined indicium from a subsequent first set of indicia if the determined number of occurrences is greater than a predetermined number and the ratio of the number of times the predetermined indicium has been discarded to the number of times the predetermined indicium has appeared in the first set of indicia is less than a predetermined ratio.

2. The method as described in claim 1, wherein a predetermined number of primary games are formed.

3. The method as described in claim 1, further including subtracting from the total count of each occurrence the counted occurrence of each predetermined indicium after a predetermined number of primary game outcomes.

4. The method as described in claim 1, wherein each occurrence of the predetermined indicium is counted from the subset of the first set of indicia.

5. The method as described in claim 1, wherein each occurrence of the predetermined indicium is counted from the first set of indicia.

6. The method as described in claim 1, wherein each occurrence of the predetermined indicium is counted from the replacement set of indicia.

7. The method as described in claim 1, wherein each occurrence of the predetermined indicium is counted from the held set of indicia.

8. The method as described in claim 1, wherein the step of counting each occurrence includes randomly selecting the predetermined indicium.

9. The method as described in claim 1, wherein each occurrence of the predetermined indicium is counted from the first set of indicia and the replacement set of indicia.

10. A method of playing a wagering game, comprising performance of each of the following steps by a processor of a device operable to facilitate a wagering game:

recognizing a wager for a gaming session;

determining a duration for the gaming session;

forming a plurality of primary games comprising a plurality of indicia;

counting each occurrence of a predetermined indicium in the plurality of primary games to determine a secondary game outcome;

providing a first award for a winning primary game outcome;

providing a second award for a winning secondary game outcome if a total count of each occurrence of the predetermined indicium satisfies a predetermined threshold;

determining a number of occurrences of the predetermined indicium over a course of the plurality of primary games;

determining a number of times the predetermined indicium has been discarded over the course of the plurality of primary games; and outputting a message encouraging the discarding of the predetermined indicium from a subsequent primary game if the determined number of occurrences is greater than a predetermined number and the ratio of the number of times the predetermined indicium has been discarded to the number of times the predetermined indicium has appeared in the first set of indicia is less than a predetermined ratio.

11. The method as described in claim 10, further including subtracting from the total count of each occurrence the counted occurrence of each predetermined indicium after a predetermined number of primary game outcomes.

12. The method as described in claim 10, wherein forming each of the primary games comprises:

receiving a first set of indicia;

discarding a subset of the first set of indicia to create a held set of indicia;

receiving a set of replacement indicia; and forming a second set of indicia to determine the outcome of the primary game.

13. The method as described in claim 12, wherein each occurrence of the predetermined indicium is counted from the subset of the first set of indicia.

14. The method as described in claim 12, wherein each occurrence of the predetermined indicium is counted from the held set of indicia.

15. The method as described in claim 12, wherein each occurrence of the predetermined indicium is counted from the first set of indicia.

16. The method as described in claim 12, wherein each occurrence of the predetermined indicium is counted from the first set of indicia and the replacement set of indicia.

* * * * *